United States Patent
Matyas, Jr. et al.

(10) Patent No.: US 6,697,947 B1
(45) Date of Patent: Feb. 24, 2004

(54) BIOMETRIC BASED MULTI-PARTY AUTHENTICATION

(75) Inventors: Stephen Michael Matyas, Jr., Manassas, VA (US); Mohammad Peyravian, Cary, NC (US); Allen Leonid Roginsky, Durham, NC (US); Nevenko Zunic, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/335,378

(22) Filed: Jun. 17, 1999

(51) Int. Cl.[7] .............................. H04K 1/00; H02L 9/00
(52) U.S. Cl. ...................... 713/182; 713/155; 713/180; 713/186; 380/282; 380/285; 380/286
(58) Field of Search ................. 713/812, 155, 713/180, 186, 182; 380/282, 285, 286

(56) References Cited

U.S. PATENT DOCUMENTS

| | | | | |
|---|---|---|---|---|
| 5,229,764 A | * | 7/1993 | Matchett et al. ........... 340/5.52 |
| 5,534,855 A | * | 7/1996 | Shockley et al. .......... 340/5.52 |
| 5,818,738 A | * | 10/1998 | Effing ........................ 702/117 |
| 6,052,468 A | * | 4/2000 | Hillhouse ................... 380/281 |
| 6,141,750 A | * | 10/2000 | Micali ........................ 713/168 |
| 6,148,094 A | * | 11/2000 | Kinsella ..................... 345/167 |
| 6,160,903 A | * | 12/2000 | Hamid et al. ............... 382/115 |
| 6,213,391 B1 | * | 4/2001 | Lewis ........................ 235/380 |
| 6,272,495 B1 | * | 8/2001 | Hetherington .............. 707/101 |
| 6,301,376 B1 | * | 10/2001 | Draganoff ................... 382/124 |

OTHER PUBLICATIONS

Schneier, Bruce, Applied Cryptography, 1996, John Wiley & Sons, Inc., pp. 71–72.*

* cited by examiner

*Primary Examiner*—Justin T. Darrow
*Assistant Examiner*—Benjamin E. Lanier
(74) *Attorney, Agent, or Firm*—Myers Bigel Sibley & Sajovec, P. A.; Jeanine S. Ray Yarletts

(57) ABSTRACT

Methods, systems and computer program products are provided which allow for multi-party authentication by receiving a plurality of biometric authentication messages from a corresponding plurality of users. The biometric authentication messages include biometric data corresponding to the user. It is determined if each of the plurality of received biometric authentication messages is a valid message based on the biometric data contained in the biometric authentication messages so as to determine a quantity of valid biometric authentication messages. An indication of authentication is then provided if the quantity of the valid messages of the received plurality of messages is at least an authentication threshold value.

27 Claims, 14 Drawing Sheets

BIOMETRIC BASED MULTI-PARTY AUTHENTICATION

FIELD OF THE INVENTION

The present invention relates to authentication of users and more particularly to multi-party authentication.

BACKGROUND OF THE INVENTION

In user authentication, it may be useful to provide access to certain resources or allow certain operations only if multiple users have been authenticated. For example, in software code revision, it may be beneficial to only allow certain revisions, such as publication of a new version, if such revisions are authorized by multiple authenticated users. Similarly, it may be beneficial for certain financial transactions or to maintain privacy to require multiple user authentication before completing the transaction or allowing access to the private information.

Previously, threshold systems have been devised to control access to resources, information, or to authorize transactions or activities only if a specified number of users are authenticated. Such systems provide increased security over single user authentication or verification systems because an attacker would have to impersonate each of the specified number of users to break the security system. Alternatively, a sharing scheme could be utilized where only a subset of the users are required for authentication or verification.

While such multi-party authentication and sharing schemes are known in the art, the potential still remains for an attacker to overcome the multi-party system by acquiring user identifications for multiple users and then impersonating those users utilizing the acquired user identifications. Thus, further improvements may be needed to increase the security of multi-party systems.

SUMMARY OF THE INVENTION

In view of the above discussion, it is an object of the present invention to provide improved security in multi-party authentication/verification systems.

These and other objects of the present invention may be provided by methods, systems and computer program products for multi-party authentication which receive a plurality of biometric authentication messages from a corresponding plurality of users. The biometric authentication messages include biometric data corresponding to the user. It is determined if each of the plurality of received biometric authentication messages is a valid message based on the biometric data contained in the biometric authentication messages so as to determine a quantity of valid biometric authentication messages. An indication of authentication is then provided if the quantity of the valid messages of the received plurality of messages is at least an authentication threshold value.

By providing multi-party authentication based on biometric information, the present invention provides for the increased difficulty in impersonating an authorized user which may be provided by the use of biometric information.

In a particular aspect of the present invention, the received biometric authentication messages include a user identification and user biometric data. In such a case, the received user biometric data is compared with previously stored biometric data corresponding to the user identification of the received biometric authentication message. The received biometric authentication message is considered a valid message if the comparison indicates that the received user biometric data corresponds to the stored biometric data. The received and stored user biometric data may be a canonical biometric template generated from a plurality of biometric samples. Preferably, the canonical biometric templates are generated by majority decoding the plurality of biometric samples.

In a further embodiment of the present invention, the biometric data is compared by determining a closeness between the received user biometric data and the previously stored biometric data. The received user biometric data corresponds to the previously stored biometric data if the closeness between the received user biometric data and the previously stored biometric data is within a predefined closeness threshold.

The closeness between the received user biometric data and the previously stored biometric data may be determined based on a difference in value between the user biometric data and the previously stored biometric data. Alternatively, the closeness between the received user biometric data and the previously stored biometric data may be determined based on a Hamming distance between the received user biometric data and the previously stored biometric data.

Preferably, the user biometric data and the stored biometric data comprise at least one of fingerprint, hand geometry, iris pattern, facial features, voice characteristics, handwriting dynamics, earlobe characteristics and keystroke dynamics.

In still another embodiment of the present invention, the received biometric authentication message includes a sample of biometric information from a user and a signed tuple comprising a user identification and a biometric template corresponding to the user. In such a case, the signature of the signed tuple and the received sample of user biometric data compared with the biometric template of the received tuple if the signature of the signed tuple is verified. The received biometric authentication message is a valid message if the comparison indicates that the received sample of user biometric data corresponds to the biometric template of the signed tuple.

The comparison of the received sample of user biometric data and the biometric template of the signed tuple may be a closeness comparison as described above.

In another embodiment of the present invention, the received biometric authentication message includes an encrypted biometric sample of the user. The received encrypted biometric sample is compared with encrypted biometric templates of valid users. The received biometric authentication message is considered a valid message if the comparison indicates that the received encrypted biometric sample corresponds to an encrypted biometric template of a valid user.

The comparison of the received encrypted biometric sample and the encrypted biometric template may be a determination of closeness between the received encrypted biometric sample and a candidate encrypted biometric template. The encrypted biometric sample corresponds to the candidate encrypted biometric template if the closeness between the received encrypted biometric sample and a candidate encrypted biometric template is within a closeness threshold.

As described above, the closeness between the received encrypted biometric sample and a candidate encrypted biometric template may be determined based on a difference in value between the biometric sample and the biometric template. Similarly, the closeness between the received encrypted biometric sample and a candidate encrypted biometric template may be determined based on a Hamming distance between the biometric sample and the biometric template.

In an embodiment where the closeness between the received encrypted biometric sample and a candidate encrypted biometric template is determined based on a difference in value between the biometric sample and the biometric template, the number of bits in the biometric templates (T) corresponding to the encrypted biometric templates is denoted by f, a publicly known prime number (p) larger than $2^f$ is fixed, and a non-secret integer (g) between 2 and p−2 is selected. In such a case, the biometric templates (T) of valid users may be encrypted by determining $z=g^T \pmod p$ to provide the encrypted biometric templates (z) of valid users. Valid closeness indicator values (x) may be generated where $x=g^v \pmod p$ for integers between 0 and the closeness threshold. The valid closeness indicators are then stored.

The biometric sample (B) is also encrypted by determining $y=g^B \pmod p$ so as to provide the encrypted biometric sample (y). The closeness between the received encrypted biometric sample and a candidate encrypted biometric template and the determination that the encrypted biometric sample corresponds to the candidate encrypted biometric template if the closeness between the received encrypted biometric sample and a candidate encrypted biometric template is within a closeness threshold may then be performed by determining if either $y/z \pmod p$ or $(y/z)^{-1} \pmod p$ is equal to one of the stored valid closeness indicator.

Furthermore, a plurality of biometric templates having a plurality of closeness thresholds may be associated with a user. In such a case, the valid closeness indicator values (x), where $x=g^v \pmod p$, may be generated for integers between 0 and a highest value of the closeness thresholds associated with the plurality of biometric templates.

In another embodiment, the closeness between the received encrypted biometric sample and a candidate encrypted biometric template is determined based on a Hamming distance between the biometric sample and the biometric template. Again, the biometric templates (T) corresponding to the encrypted biometric templates comprise f bits, a publicly known prime number (p) is larger than $2^f$ and a non-secret integer (g) is between 2 and p−2. The biometric templates (T) of valid users are encrypted by determining $z=g^T \pmod p$ to provide the encrypted biometric templates (z) of valid users. A biometric sample (B) is encrypted by determining $y=g^B \pmod p$ so as to provide the encrypted biometric sample (y). The set of values $2^{n^m}$ for each m and n are stored as a set of initial closeness indicators (c), where n is the set of integer values from 0 to 2 and m is the set of integer values from 0 to f−1. The encrypted biometric sample corresponds to the candidate encrypted biometric template if the closeness between the received encrypted biometric sample and a candidate encrypted biometric template is within a closeness threshold where the closeness between the encrypted biometric sample (y) and the encrypted biometric template (z) is determined utilizing the initial closeness indicators (c).

In particular, the closeness between the encrypted biometric sample (y) and the encrypted biometric template (z) may be determined by determining if either $y/z \pmod p$ or $(y/z)^{-1} \pmod p$ is equal to one of the stored initial closeness indicators. Alternatively, the closeness between the encrypted biometric sample (y) and the encrypted biometric template (z) may be determined by determining if either $cy/z \pmod p$, $c(y/z)^{-1} \pmod p$, $c^{-1}(y/z) \pmod p$ or $c^{-1}(y/z)^{-1} \pmod p$ is equal to one of the stored initial closeness indicators.

In still another embodiment of the present invention, a secret value is distributed across multiple users by dividing the secret value into a plurality of shares. A canonical biometric template is determined for each of the multiple users and each of the canonical biometric templates encoded to provide corresponding check digits. An offset is determined for each of the multiple users where the offset associated with a users is determined based on the canonical biometric template of the user and a share of the secret value associated with the user. The corresponding offset and check digits are then provided to corresponding ones of the multiple users.

To recover the secret value, a sampled canonical biometric template is obtained from a plurality of the multiple users. Corresponding offset and check digits of the plurality of multiple users are also obtained. The sampled canonical biometric templates are then error corrected utilizing the corresponding check digits of the plurality of multiple users so as to provide corrected canonical biometric templates for the plurality of the multiple users. Shares of the secret value corresponding to the plurality of the multiple users are then determined from the corresponding offset and corrected canonical biometric templates of the plurality of the multiple users. The secret value is then recovered from the determined shares of the secret value.

The canonical biometric template for each of the multiple users may be determined by obtaining a plurality of biometric samples for each of the multiple users and majority decoding the plurality of samples for corresponding ones of the multiple users so as to provide corresponding canonical biometric templates. Furthermore, the canonical biometric templates may be encoded by generating an (N,M,D) code having an M-bit information vector and N-M bits of error correction check digits where the canonical biometric templates comprise M bits. Preferably, the secret value is divided into a plurality of shares where the secret value can be reconstructed from fewer than all of the plurality of shares. The secret value may be a secret key utilized with a public key cryptographic algorithm.

The sampled canonical biometric template may be obtained from a plurality of the multiple users and the corresponding offset and check digits of the plurality of multiple users obtained by receiving from the plurality of multiple users a signed triple which comprises the offset, check digits and sampled canonical biometric templates corresponding to the user. The authenticity of the signature of the signed triple may be verified and the signed triple rejected if the verification fails to authenticate the signature of the signed triple.

In still another embodiment of the present invention, biometric information is stored by storing a user identification associated with the biometric information, storing each of a plurality of templates of biometric data associated with the user identification and storing an identification of at least one of the plurality of templates as a primary biometric authentication type. Furthermore, a biometric type identification associated with each of the plurality of templates may also be stored. Preferably, the plurality of templates and the identification of the primary biometric authentication type are stored in an array indexed by the user identification.

The primary biometric authentication type may be changed by receiving a message to change the identification of the primary biometric authentication type associated with a user. In such a case, a plurality of biometric validations may be required prior to changing the identification of the primary biometric authentication type associated with the user.

As will further be appreciated by those of skill in the art, the present invention may be embodied as methods, apparatus/systems and/or computer program products.

DETAILED DESCRIPTION OF THE INVENTION

Figure 1:
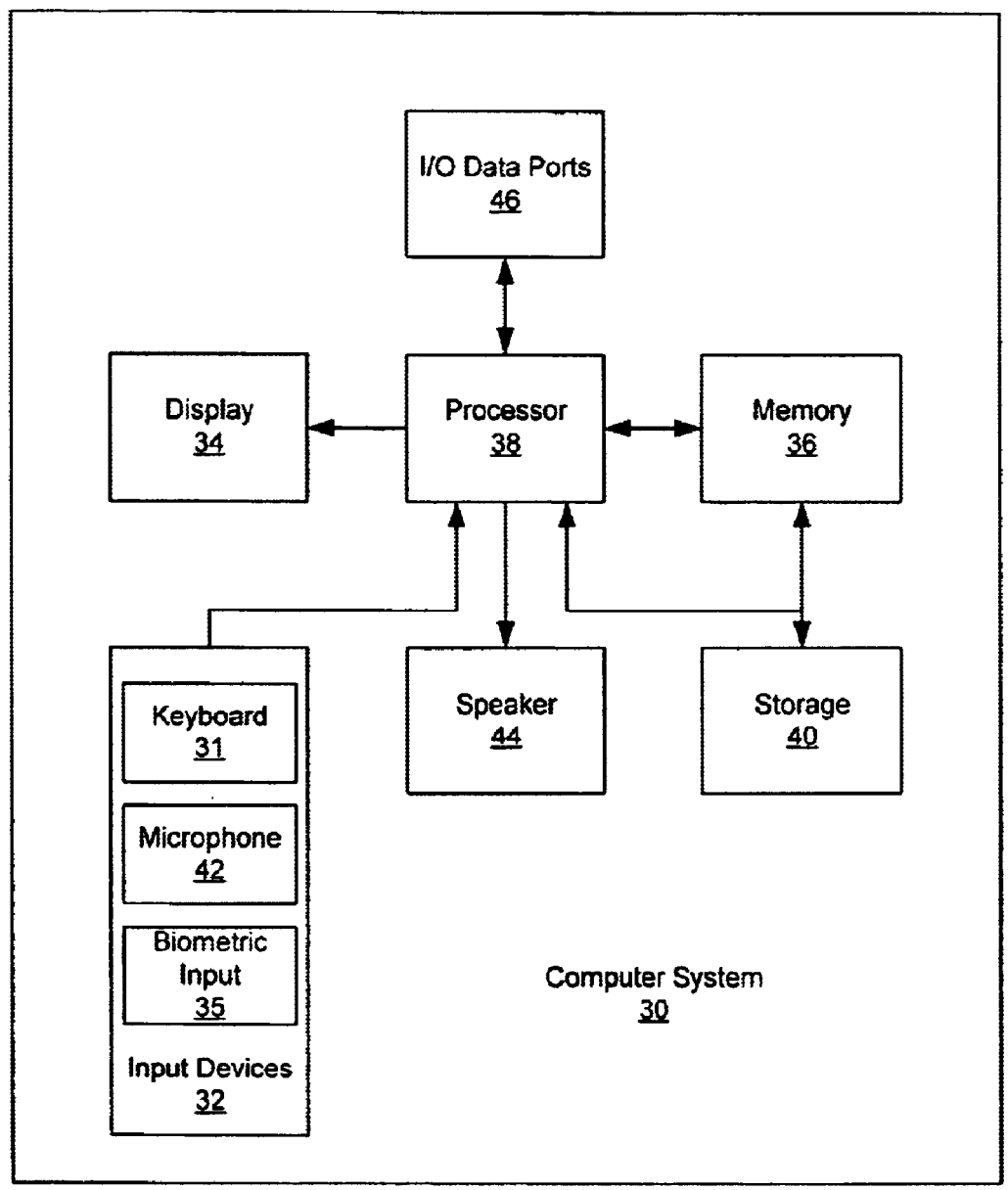
FIG. 1 is diagram of a data processing system suitable for use with the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention can be embodied as systems, methods, or computer program products for multi-party authentication, verification or value generation utilizing biometric information. As is well known to those having skill in the art, biometric information is one or more behavioral and/or physiological characteristics of an individual. Biometric identification and/or verification uses a data processing system to enable automatic identification and/or verification of identity by computer assessment of a biometric characteristic. In biometric verification, biometric information is verified for a known individual. In biometric identification, biometric information for an individual is compared to known biometric information for man y individual s in order to identify the individual.

Biometric identification/verification systems, methods and computer program products can measure one or more of the following behavioral and/or physiological characteristics of an individual: fingerprint, hand geometry, iris pattern, facial features, voice characteristics, handwriting dynamics, earlobe characteristics and keystroke dynamics. Other biometric characteristics may be used. Applications using biometric technologies include biometric check cashing machines, payment systems that substitute biometric data for personal identification numbers, access control systems that use biometric data, biometric employee time and attendance recording and biometric passenger control for transportation. Many other applications may utilize biometric information for identification and/or verification. See the publications entitled "*Biometrics, Is it a Viable Proposition for Identity Authentication and Access Control*", to Kim, Computers & Security, Vol. 14, 1995, pp. 205–214; "*A Robust Speaker Verification Biometric*", to George et al., Proceedings, the IEEE 29$^{th}$ International Carnahan Conference on Security Technology, October 1995, pp. 41–46; "*On Enabling Secure Applications Through Off-line Biometric Identification*", to Davida et al., Proceedings of the IEEE Computer Society Symposium on Research in Security and Privacy, 1998, pp. 148–157; and "*Biometric Encryption: Information Privacy in a Networked World*", to Brown et al., EDI Forum: The Journal of Electronic Commerce, v. 10, No. 3, 1997, pp. 37–43.

While the present invention is described herein as utilizing a single biometric type for authentication, as will be appreciated by those of skill in the art, multiple types of biometric data may be utilized for authentication. Thus, for example, fingerprint and iris scan may be used in combination to generate a biometric template for a user. Furthermore, these different types of biometric data may be treated individually to provide multiple biometric vectors of templates or combined to provide a single vector or template.

The present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Referring now to FIG. 1, an exemplary embodiment of a computer system 30 in accordance with the present invention typically includes input devices 32, such as a keyboard or keypad 31, a microphone 42 and/or preferably, a biometric information input device 35. The computer system 30 also preferably includes a display 34 and a memory 36 that communicate with a processor 38. The computer system 30 may further include a speaker 44 and an I/O data port(s) 46 that also communicate with the processor 38. The I/O data ports 46 can be used to transfer information between the computer system 30 and another computer system or a network (e.g., the Internet). FIG. 1 also illustrates that computer system 30 may include a storage device 40 which communicates with memory 36 and processor 38. Such a storage device may be any type of data storage device as described above. These components are included in many conventional computer systems (e.g., desktop, laptop, or handheld computers) and their functionality is generally known to those skilled in the art.

Furthermore, while the present invention is described with respect to the computer system 30, as will be appreciated by those of skill in the art, the present invention may be incorporated into many other devices where multiple party authentication/verification may be desired and, thus, may comprise an embedded function in many other devices. Thus, the present invention should not be construed as limited to use in computer systems such as illustrated in FIG. 1 but may be incorporated in any device having sufficient processing capabilities to carry out the operations described below. Furthermore, as will be appreciated by those of skill in the art, the present invention may be utilized in a distributed system where multiple users' workstations or other processing systems are operably connected with a central authority processing system. Such systems may include dedicated devices connected to a central processing system, remote processors connected through a network or through direct connection, or other mechanisms for distributing the operations of the present invention across multiple processing systems. While the present invention is described with respect to the processing system in FIG. 1, the present invention should not be construed as limited to operations carried out by a single processing system but should include systems where operations are carried out by multiple processing systems. The processing system of FIG. 1 is, therefore, merely provided as an example of a suitable processing system for use with the present invention and may be utilized as a user's processing system, a central authority processing system or as a single processing system to which multiple users have access.

Figure 2:
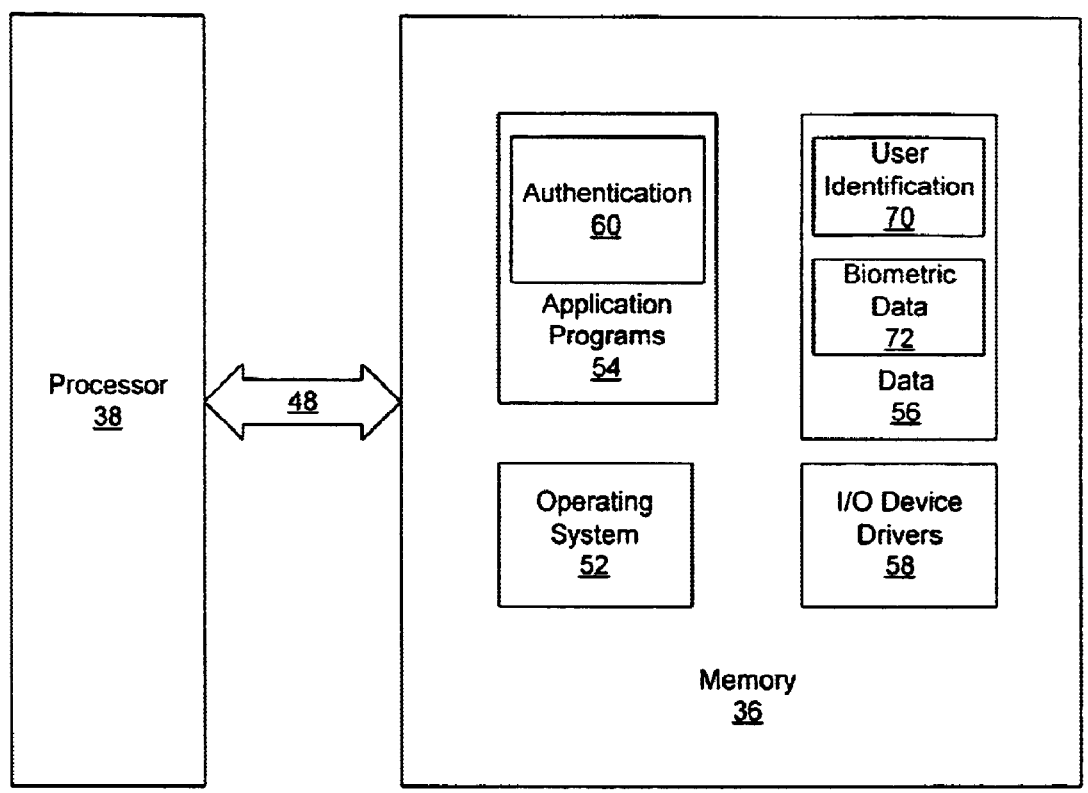
FIG. 2 is a detailed view of a data processing system suitable for use with the present invention.

FIG. 2 is a more detailed block diagram of the computer system 30 that illustrates one application of the teachings of the present invention. The processor 38 communicates with the memory 36 via an address/data bus 48. The processor 38 can be any commercially available or custom microprocessor or other processing system capable of carrying out the operations of the present invention. The memory 36 is representative of the overall hierarchy of memory devices containing the software and data used to implement the functionality of the computer system 30. The memory 36 can include, but is not limited to, the following types of devices: cache, ROM, PROM, EPROM, EEPROM, flash, SRAM, and DRAM. As shown in FIG. 2, the memory 36 may hold four major categories of software and data used in the computer system 30: the operating system 52; the application programs 54; the input/output (I/O) device drivers 58; and the data 56. The I/O device drivers 58 typically include software routines accessed through the operating system 52 by the application programs 54 to communicate with devices such as the input devices 32, the display 34, the speaker 44, the microphone 42, the I/O data port(s) 46, and certain memory 36 components. The application programs 54 comprise the programs that implement the various features of the computer system 30 and preferably include at least one application module or object for multi-party authentication/verification 60 which carries out the operations of the present invention as described below. As will be appreciated by those of skill in the art, the module or object 60 may perform different operations as described below depending on the use of the computer system 30 as a user's workstation, a central authority processing system or a shared processing system.

Finally, the data 56 represents the static and dynamic data used by the application programs 54, operating system 52, I/O device drivers 58, and any other software program that may reside in the memory 36. As illustrated in FIG. 2, the data 56 preferably includes a user identification 70 and biometric data 72 associated with the user. Additional intermediate data (not shown) may also be stored in memory. Furthermore, while the present invention is described as an application executing on computer system 30, as will be appreciated by those of skill in the art, the present invention may be implemented in any number of manners, including incorporation in operating system 52 or in an I/O device driver 58.

The present invention will now be described with respect to FIGS. 3 through 16 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

The present invention provides for utilizing biometric data in multi-party situations. In the multiparty biometric-based authentication/verification systems described herein, each user has at least one biometric characteristic measured by the system. These biometric characteristic types (fingerprint, hand geometry, iris pattern, etc.) can be identical or different for each user. Biometric data samples are obtained, such as with biometric input 35, in advance from each user and biometric templates are then calculated from these data for each user. There are n users (where n>0), denoted by their user identifications: $U_1, U_2, \ldots U_n$. The users' pre-computed reference "biometric templates" are denoted by $T_1, T_2, \ldots T_n$. The users' "biometric samples" taken in real-time are denoted by $B_1, B_2, \ldots B_n$. To create a valid verification it is necessary that at least k of the users (where 0<k<n) present valid biometric samples to the system.

Figure 3:
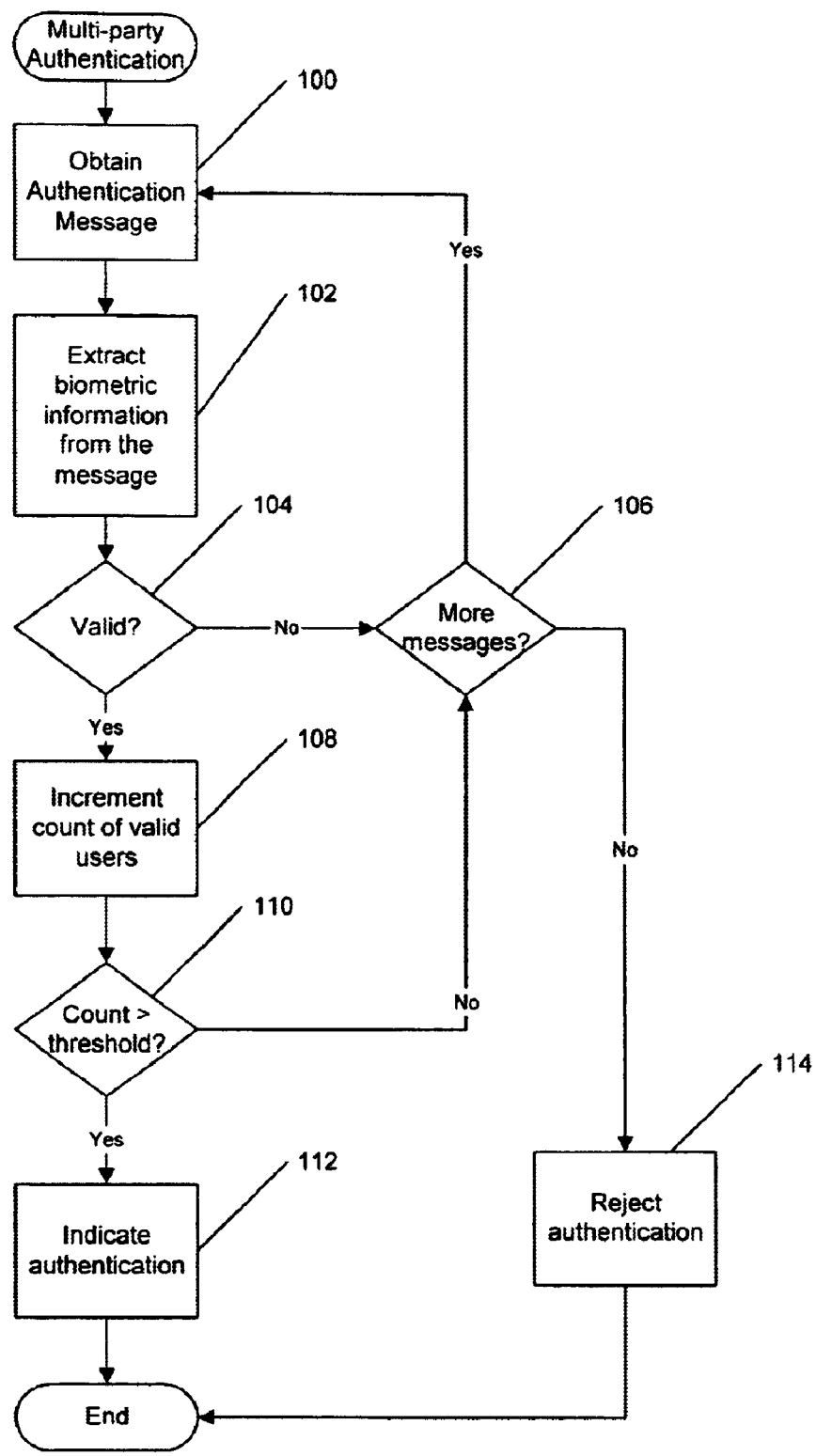
FIG. 3 is a flowchart illustrating operations according to one embodiment of the present invention.

FIG. 3 illustrates one embodiment of the present invention. As is illustrated in FIG. 3, an authentication message is obtained from a user (block 100) by, for example, receiving the information at the I/O data ports 46 of computer system 30. The biometric information about the user is extracted from the authentication message (block 102). It is then determined if the biometric information is valid for the user (block 104) and, if so, a valid count is incremented to indicate that the user provided valid biometric information (block 108). It is then determined if the count of valid users exceeds the threshold for allowing authentication (i.e. have k users provided valid biometric information) (block 110). If the threshold has been reached, then an indication of authenticity is provided (block 112).

If the biometric information provided by the user is not valid (block 104) or if the authentication threshold has not been reached (block 110), then it is determined if more messages are available to process (block 106). If more messages are available to process then the next message is obtained and the validation process repeated. If however, no more messages are available to process, then there are insufficient users providing valid biometric information and the authentication of the users is rejected (block 114).

As will be appreciated by those of skill in the art, the present invention may be utilized in many different applications. Accordingly, the present invention has been described with respect to the authentication operations rather than the operations for receiving messages, rejecting duplicate messages, establishing timeout procedures or establishing time durations in which received messages are considered for authentication. Such specifics of particular uses of the present invention may vary from application to application and may be readily determined by one of skill in the art in light of the discussion herein. Accordingly, in the interest of clarity, such application specific details are omitted from the description of the present invention provided herein as such details would be readily apparent to those of skill in the art in light of the particular application to which the teachings of the present invention are applied.

Figure 4:
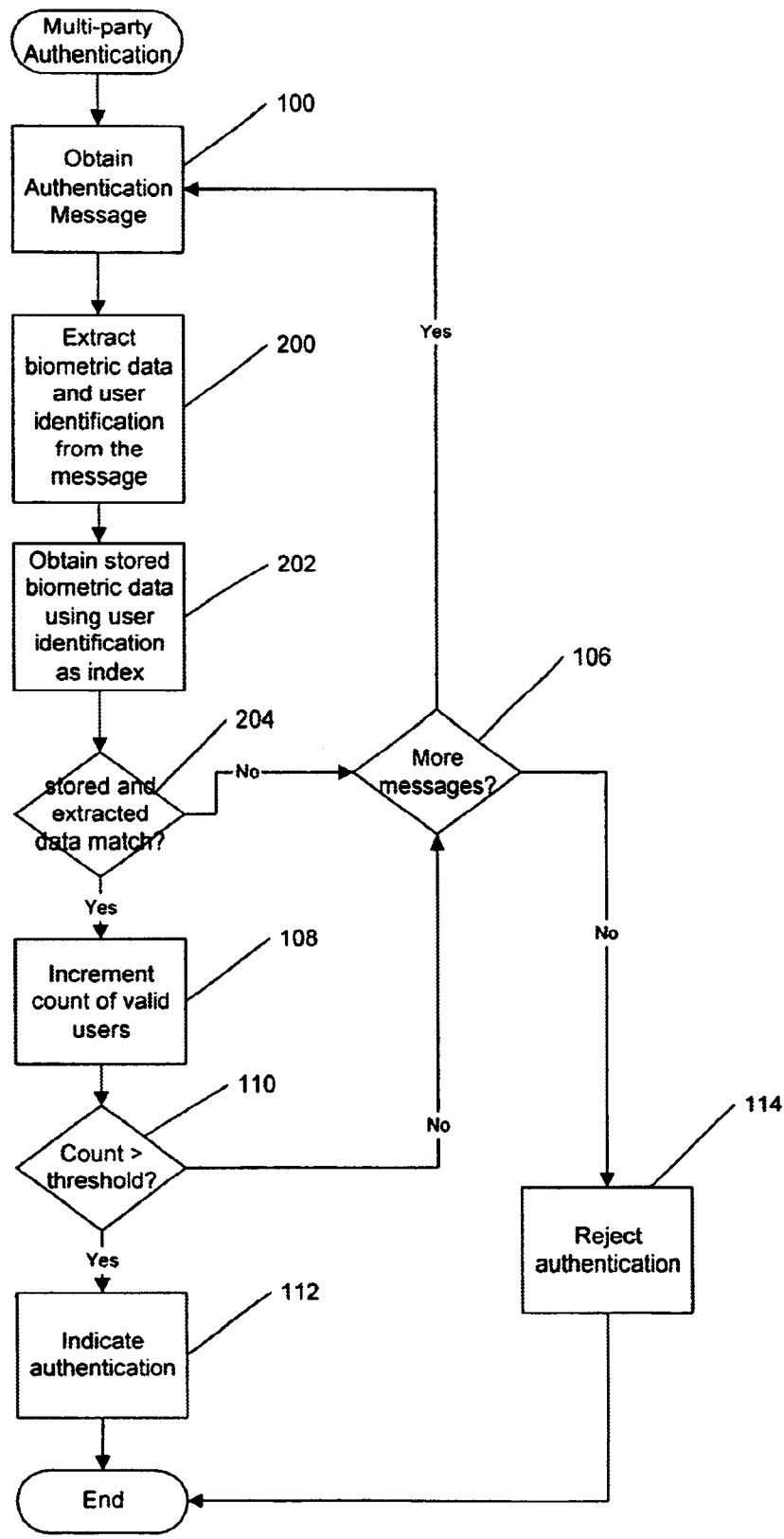
FIG. 4 is a flowchart illustrating operations according to a first alternative embodiment of the present invention.

FIG. 4 illustrates a particular embodiment of the present invention illustrated in FIG. 3. In the system illustrated in FIG. 4, the user identifications (i.e., $U_1, U_2, \ldots U_n$) and their associated biometric templates (i.e., $T_1, T_2, \ldots T_n$) are stored in the system in a central database (e.g., at a server) as tuples of the form ($U_i$, $T_i$). In this case, the system protects the integrity of the stored ($U_i$, $T_i$) values. Each user, i, presents user identification (i.e., $U_i$) and the biometric sample (i.e., $B_i$) to the system. The system checks each user-supplied tuple ($U_i$, $B_i$) against the associated system tuple ($U_i$, $T_i$). If k or more valid user-supplied tuples are presented to the system, then a valid verification is created.

Thus, as seen in FIG. 4, an authentication message is obtained (block 100) and biometric data for a user and a user identification (i.e. the tuple ($U_i$, $B_i$)) is extracted from the authentication message (block 200). The stored biometric data is then retrieved utilizing the user identification in the extracted tuple (block 202). A comparison is then made utilizing the stored biometric data $T_i$ and the extracted biometric data $B_i$ (block 204). If the biometric information matches (block 104) then a valid count is incremented to indicate that the user provided valid biometric information (block 108). It is then determined if the count of valid users exceeds the threshold for allowing authentication (i.e. have k users provided valid biometric information) (block 110). If the threshold has been reached, then an indication of authenticity is provided (block 112).

If the biometric information provided by the user is not valid (block 204) or if the authentication threshold has not been reached (block 110), then it is determined if more messages are available to process (block 106). If more messages are available to process then the next message is obtained and the validation process repeated. If however, no more messages are available to process, then there are insufficient users providing valid biometric information and the authentication of the users is rejected (block 114).

Figure 5:
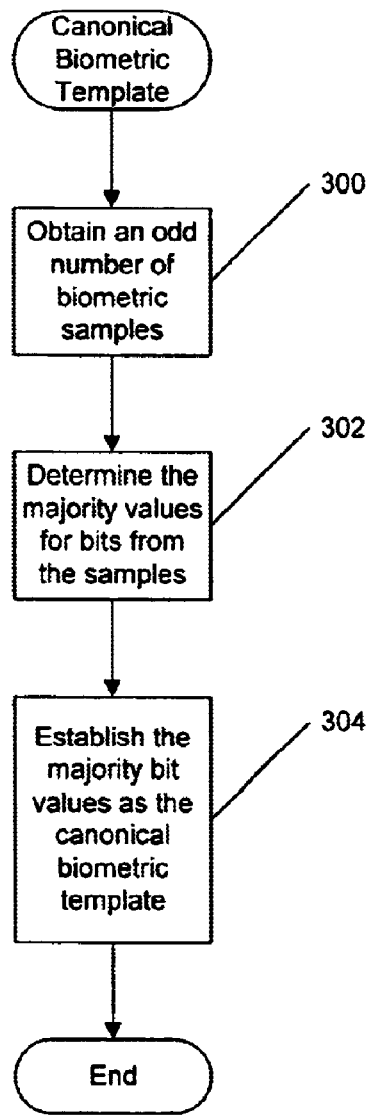
FIG. 5 is a flowchart illustrating operations for determining a canonical biometric template for use with the present invention.

In an alternative embodiment of the system of FIG. 4, a canonical biometric template is utilized as the stored and extracted biometric information. The generation of a canonical biometric template may be performed as illustrated in FIG. 5. As stated in Davida et al., if several measurements of a biometric are subjected to majority decoding at the time of template creation, then that template can be considered the "canonical" biometric template. Majority decoding may not be applicable to all types of biometric templates, but may be suitable for use with, for example, iris biometrics. In the event that biometrics are utilized which are not suitable for majority decoding, then alternative methods of developing a canonical biometric template may be required. As will be appreciated by those of skill in the art, these methods may depend on the type of biometric. Furthermore, for some forms of biometrics a canonical biometric template need not be determined if, for example, there is no variation in biometric samples. Thus, while the present invention is described with regard to majority decoding to develop a canonical template, the present invention should not be construed as requiring use of majority decoding or a canonical template for all types of biometrics.

Majority decoding can best be illustrated with an example. If one has an odd number of biometric samples, say $B_1$=10110101, $B_2$=10010111, and $B_3$=11100111, then the biometric vector obtained via majority decoding would be B=10110111. That is, in the three biometric samples ($B_1$, $B_2$, and $B_3$) the majority of bits in the first bit position are ones, the majority of bits in the second bit position are zeroes, the majority of bits in the third bit position are ones, and so forth. Thus, as seen in FIG. 5, an odd number of biometric measurements are obtained for a user (block 300). The majority values for bits from the samples are then determined (block 302) and a canonical template established using the majority bit values as the bits in the template (block 304).

The canonical biometric templates of users would then be utilized in the system of FIG. 4 by storing the canonical biometric template for each user. Users would generate a new template by taking multiple biometric samples and then majority decoding the samples to provide a new canonical template. The new canonical template would be provided with the authentication message and compared to the stored canonical template to determine the validity of the authentication message. Otherwise, operations would proceed as described with respect to FIG. 4.

Figure 6:
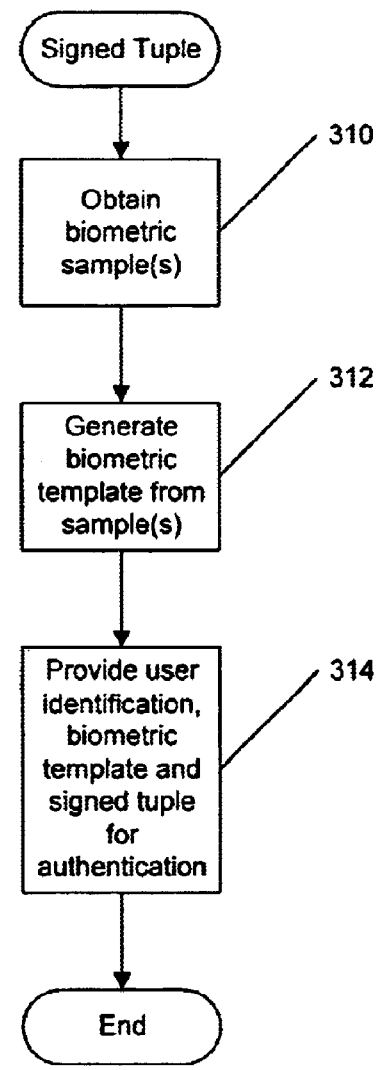
FIG. 6 is a flowchart illustrating operations carried out by a user requesting authentication according to one embodiment of the present invention.
Figure 7:
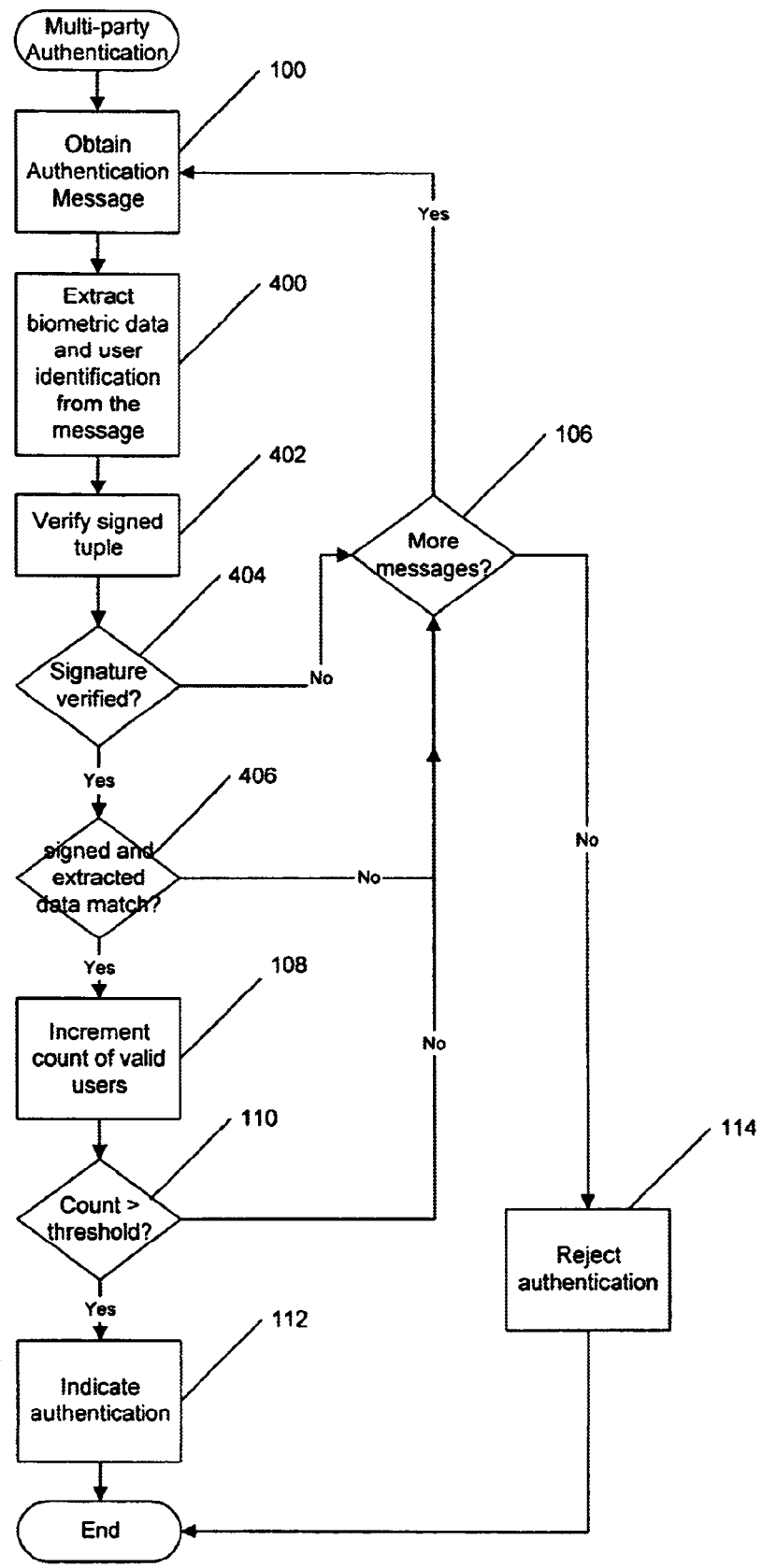
FIG. 7 is a flowchart illustrating operations of according to an alternative embodiment of the present invention.

FIGS. 6 and 7 illustrate a further alternative embodiment of the present invention. In the alternative embodiment illustrated in FIGS. 6 and 7, each user, i, presents a "signed tuple" $\{(U_i, T_i), Sig(U_i, T_i)\}$ and its biometric sample (i.e., $B_i$) as part of an authentication message. The signed tuple, for example, can be stored on a card which is then read by a card reader at the time the user presents its biometric sample for authentication. The signature of the tuple is verified and $B_i$ is checked against $T_i$. If k or more valid user-supplied signed tuples are presented for authentication then a valid verification is created.

As seen in FIG. 6, the operations of a user of the signed authentication system are illustrated. As reflected at block 310, a biometric sample or samples are obtained from the user. The biometric template is then generated from the obtained sample or samples (block 312). The user identification and the biometric template along with the signed tuple $\{(U_i, T_i), Sig(U_i, T_i)\}$ are then submitted for authentication (block 314).

FIG. 7 illustrates operations for processing an authentication message, such as that generated in FIG. 6. As is seen in FIG. 7, the authentication message is obtained (block 100) and the biometric data and user identification extracted from the message (block 400). The signature of the signed tuple in the message is then verified (block 402). If the signature is valid (block 404) then the signed biometric data in the tuple is compared to the extracted biometric data of the message (block 406). If the extracted and signed biometric data matches, then the message is validated and the valid count is incremented (block 108). It is then determined if the count of valid users exceeds the threshold for allowing authentication (i.e. have k users provided valid biometric information) (block 110). If the threshold has been reached, then an indication of authenticity is provided (block 112).

If the signature is not valid (block 404) or the signed and extracted biometric data do not match (block 406), then the message is rejected and it is determined if more messages are available for processing (block 106). If more messages are available to process then the next message is obtained and the validation process repeated. If however, no more messages are available to process, then there are insufficient users providing valid biometric information and the authentication of the users is rejected (block 114).

As will be appreciated by those of skill in the art in light of the above discussion, the biometric data utilized in the system of FIGS. 6 and 7 may take the form of a canonical biometric template such as generated by the operations of FIG. 5. Thus, the embodiment of FIGS. 6 and 7 should not be construed as limited to a single biometric sample.

The alternative embodiment of FIGS. 6 and 7 utilizes a secret symmetric or public key infrastructure in place to provide the signature over $(U_i, T_i)$. However, unlike the alternative embodiment illustrated in FIG. 4, a database of $U_i$'s and $T_i$'s does not need to be maintained (e.g., at a server).

Figure 8:
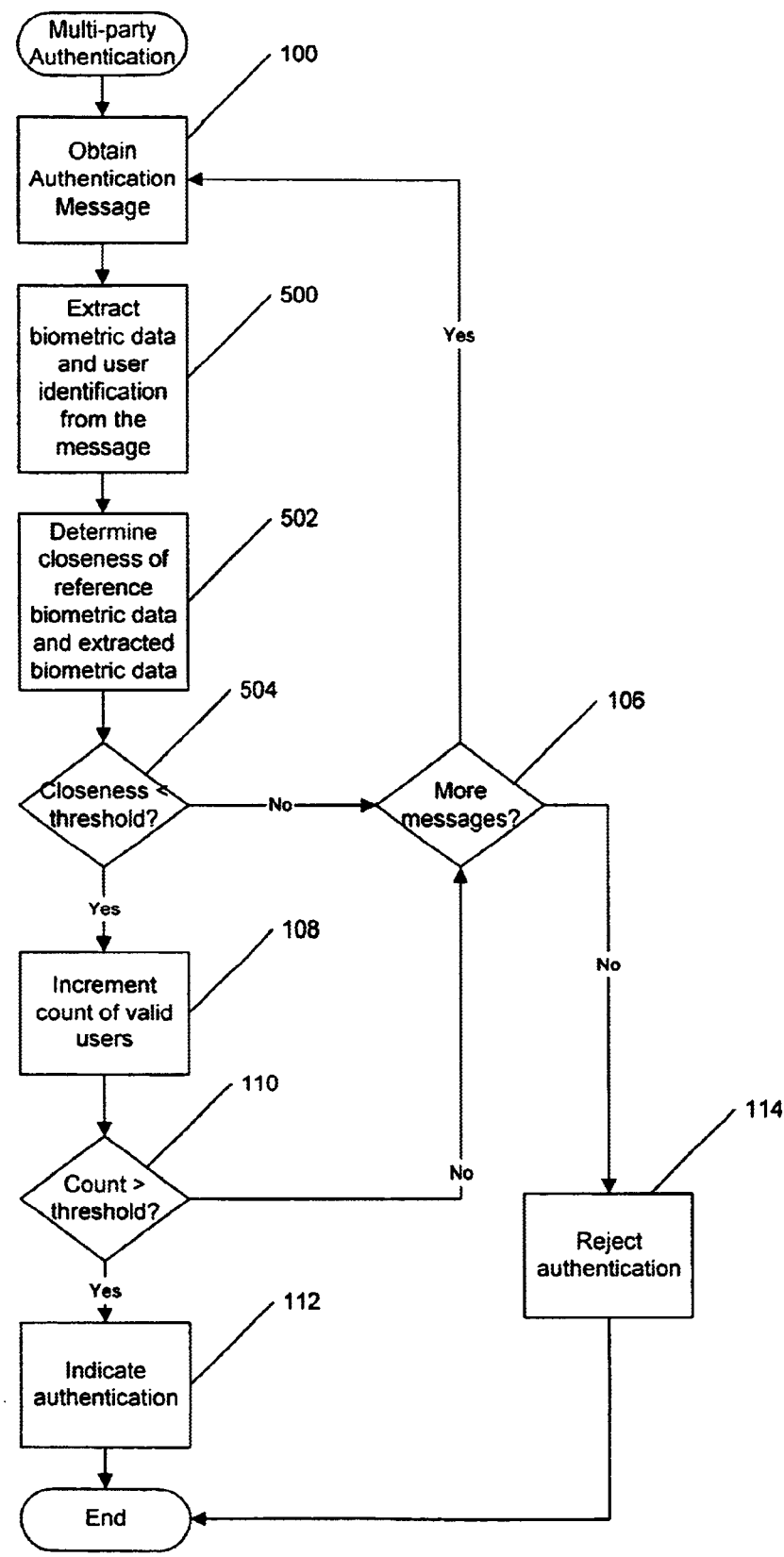
FIG. 8 is a flowchart illustrating operations according to a further alternative embodiment of the present invention utilizing a closeness determination.

FIG. 8 describes another alternative embodiment of the present invention where biometric data is compared based on a "closeness" of the data rather than an absolute equality. As is illustrated in FIG. 8, the authentication message is obtained (block 100) and the biometric data extracted from the message (block 500). The closeness of reference biometric data and the extracted biometric data is then determined (block 502). The closeness may be determined in many different ways. In particular preferred embodiments, the closeness is determined based on the difference in value between the reference biometric data and the extracted biometric data. Alternatively, the closeness is measured as the Hamming distance between the reference biometric data and the extracted biometric data. The Hamming distance between two binary values is the number of bits in which the two values differ.

After the closeness is determined, it is then determined if the closeness of the reference biometric data and the extracted biometric data is within a closeness threshold (block 504). If the closeness is within the threshold, then the message is a valid message and the valid count is incremented (block 108). It is then determined if the count of valid users exceeds the threshold for allowing authentication (i.e. have k users provided valid biometric information) (block 110). If the threshold has been reached, then an indication of authenticity is provided (block 112).

If the closeness is not within the threshold (block 504) and the message is rejected or there have been fewer than k valid messages (block 110), then it is determined if more messages are available for processing (block 106). If more messages are available to process then the next message is obtained and the validation process repeated. If however, no more messages are available to process, then there are insufficient users providing valid biometric information and the authentication of the users is rejected (block 114).

Figure 9:
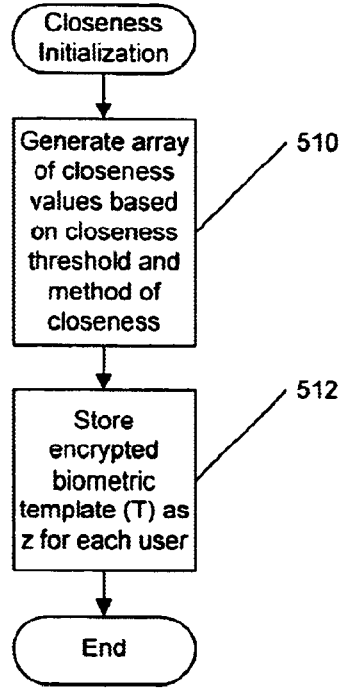
FIG. 9 is a flowchart illustrating operations for initialization of a system according to one embodiment of the present invention utilizing a closeness determination.
Figure 10:
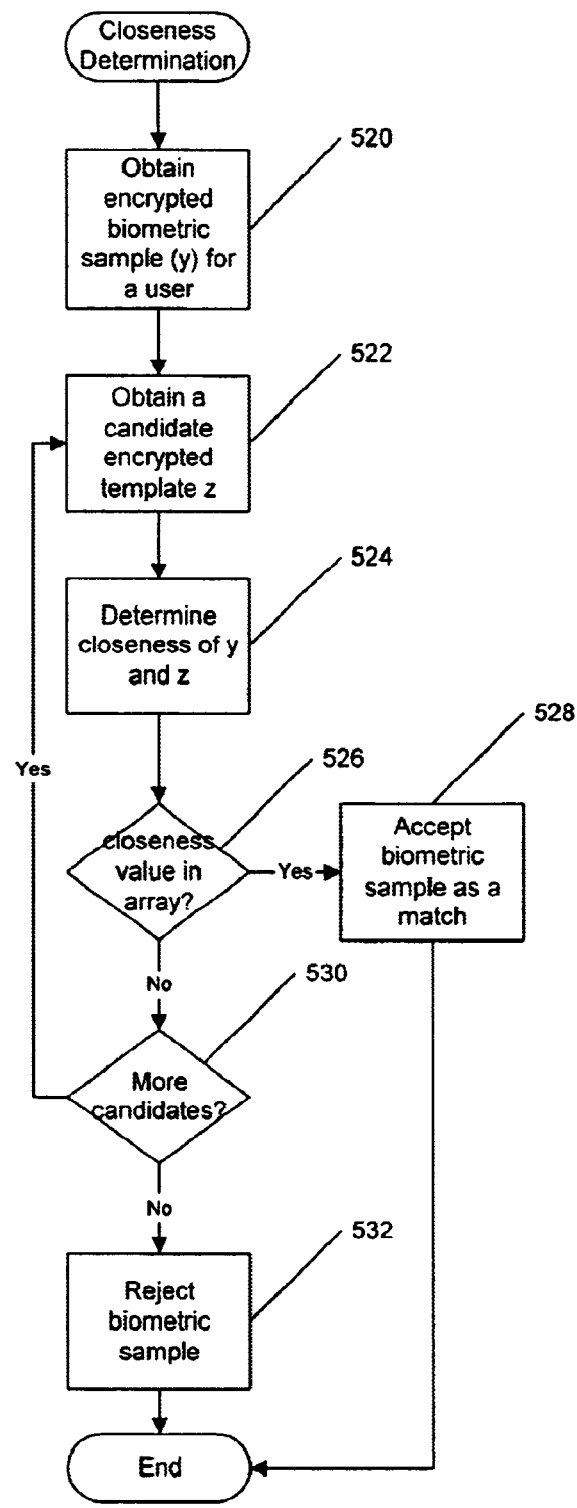
FIG. 10 is a flowchart illustrating operations for evaluating the closeness of encrypted biometric templates system according to one embodiment of the present invention utilizing a closeness determination.

The use of closeness in the multi-party biometric authentication as illustrated in FIG. 8 may be particularly well suited to comparing encrypted reference biometric data with encrypted extracted biometric data. Such a system for comparing encrypted biometric data is illustrated in FIG. 9 and FIG. 10. A biometric template $T_i$ may be encrypted to protect users' privacy or to help protect a proprietary procedure for computing template values. It is also possible that the system responsible for authenticating a candidate user cannot decrypt $T_i$ and, therefore, can not directly compare $B_i$ and $T_i$. This problem could be easily overcome if the biometric verification/identification consisted of merely checking whether $B_i = T_i$. In that case, the system could instead encrypt $B_i$ and verify that its encrypted value is equal to the encrypted value of $T_i$ where encryption is performed with the same key.

However, two samples of biometric data obtained from a user may not be exactly the same. That is, the biometric data are not precise, and so the biometric data sampled from a user are different from the calculated biometric template. Therefore, biometric verification/identification may involve only a test to determine if $B_i$ is close to $T_i$ in some sense. The closeness of $B_i$ and $T_i$ does not, however, imply that their encrypted values are close in any way. However, utilization of the operations described in FIGS. 9 and 10 may overcome this problem.

As is seen in FIG. 9, an initialization procedure involves generating an array of closeness values based on the closeness threshold and the method of closeness utilized (block 510). Furthermore, the encrypted biometric template is also stored (block 512).

The encryption and generation of the array of closeness values may be generated in several different manners. For example, the $i^{th}$ user's biometric information may be a vector ($B_{i,j}$ for j=1,2, . . . m), for some m and this vector needs to be close to a template vector ($T_{i,j}$). However, the present invention will be described with reference to a generic user U and a case of m=1, i.e., when the user's biometric data can be described by one number B. The closeness of B to T can be expressed as either:

(a) $|B-T| < d$, for some reasonably small value of d, or
(b) as having the binary representations of B and T differ in only a very small number of bits.

In the first case (a), if f is the number of bits in T, a publicly known prime number p is established where p is larger than $2^f$ and large enough that the discrete logarithm problem in the multiplicative group of GF(p) could be considered unsolvable for the purposes of a given application. Let g be a non-secret integer between 2 and p−2. The authentication system will store $z=g^T \pmod{p}$. This will guarantee that the value of T remains secret. The system will also store an array A of values $g^v \pmod p$ for all integers v between 0 and d−1 for all users.

A biometric sample that is measured as B is encrypted by computing $y=g^B \pmod p$ which is obtained by the authentication system (block 520). A z value for a potential matching stored z value is then obtained (i.e. a candidate encrypted template) (block 522). The closeness (x) of y and the candidate z is then determined by determining $x=y/z=g^{B-T} \pmod p$ (block 524). It is then determined if either x(mod p) or $x^{-1} \pmod p$ is in the closeness array A (block 526). If either x(mod p) or $x^{-1} \pmod p$ is in the closeness array A, then the user's biometric information can be accepted (block 528). If neither x(mod p) or $x^{-1} \pmod p$ is in the closeness array A then it is determined if there are more candidates (block 530) and if so the procedure is repeated until either a match is found or all candidates have been processed. If all candidates have been processed and there remains no match, then the provided encrypted biometric sample is rejected (block 532). Optionally, the system may report a forgery attempt.

The closeness array A, for all users, can be published and, in any event, it does not need to be kept secret. The knowledge of its values, even combined with the knowledge of z does not help an attacker since it is still necessary to provide the biometric information B sufficiently close to T to be authenticated.

If several biometric parameters $B_{i,1}$, $B_{i,2}$, ... $B_{i,m}$ are measured for user i, and it is necessary that $|B_{i,j}-T_{i,j}|<d_j$ for j=1,2, ..., m, then the system need only store the same array A of values with $d=\max(d_1, d_2, \ldots, d_m)$. Therefore, allowing for multiple biometric parameters does not increase the storage overhead in the authenticating system. Similarly, no additional data in the array needs to be stored to accommodate multiple users. The same array A can be used to authenticate every user $U_1, U_2, \ldots, U_n$.

If the closeness determination is made based on Hamming distance (i.e. case (b) above) then the closeness of B and T means that only a small number h of bits in the binary representations of B and T differ. Preferably, h is no greater than 2. If h=1, then, as reflected in block 510 of FIG. 9, an array C of values $\{1,g,g^2,g^{2^2}, \ldots g^{2^{j-1}}\}$ may be stored. Similarly, the encrypted biometric template (z) is determined as described above and stored (block 512). As with the previous example, an encrypted biometric sample (y) is obtained (block 520) and candidate biometric templates (z) are also obtained (block 522). The closeness is then again determined as $x=y/z=g^{B-T} \pmod p$ (block 524). If either x(mod p) or $x^{-1} \pmod p$ is in the stored array C, then the user's biometric information can be accepted (block 528). If neither x(mod p) or $x^{-1} \pmod p$ is in the closeness array C then it is determined if there are more candidates (block 530) and if so the procedure is repeated until either a match is found or all candidates have been processed. If all candidates have are processed and there remains no match, then the provided encrypted biometric sample is rejected (block 532). Optionally, the system may report a forgery attempt.

If h=2, then the same array C may be stored. In such a case, the system checks if for any c in C one of the four values xc(mod p), $x^{-1}$c(mod p), $xc^{-1}$(mod p), or $x^{-1}c^{-1}$(mod p) is in C, where c is a value in the array C. Furthermore, as with the array A, the same array C may serve multiple users and different biometric parameters.

Thus, the closeness arrays A and C provide an exhaustive list of potential valid closeness values if the biometric values which are encrypted are the same. Accordingly, the present invention could be extended to other measures of closeness or increased Hamming distances if an exhaustive list of potential valid closeness values of the biometric values which are encrypted may be generated.

As will be appreciated by those of skill in the art, the encryption closeness determinations described above with respect to FIGS. 9 and 10 may be readily incorporated into the system of FIG. 8. Thus, the operations of FIG. 10 may correspond to the operations of block 100, 500, 502 and 504 of FIG. 8. Accordingly, the embodiment illustrated in FIGS. 8, 9 and 10 provides for multi-party authentication without requiring decryption of a user's biometric data and further may take into account variation in biometric data supplied by a valid user.

Figure 11:
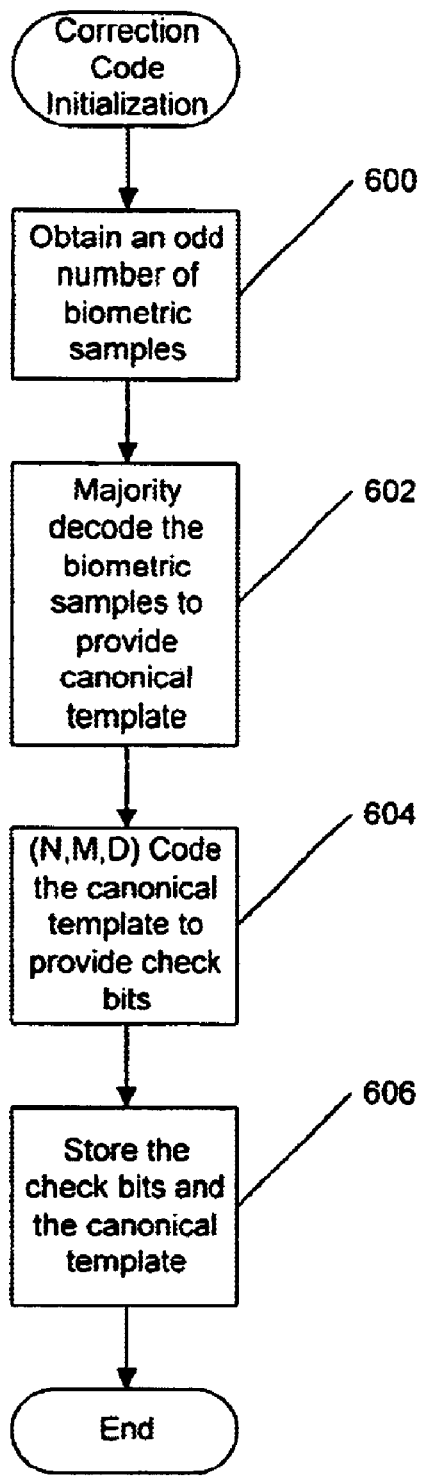
FIG. 11 is a flowchart illustrating operations for initialization of a system according to one embodiment of the present invention utilizing error correction coding.
Figure 12:
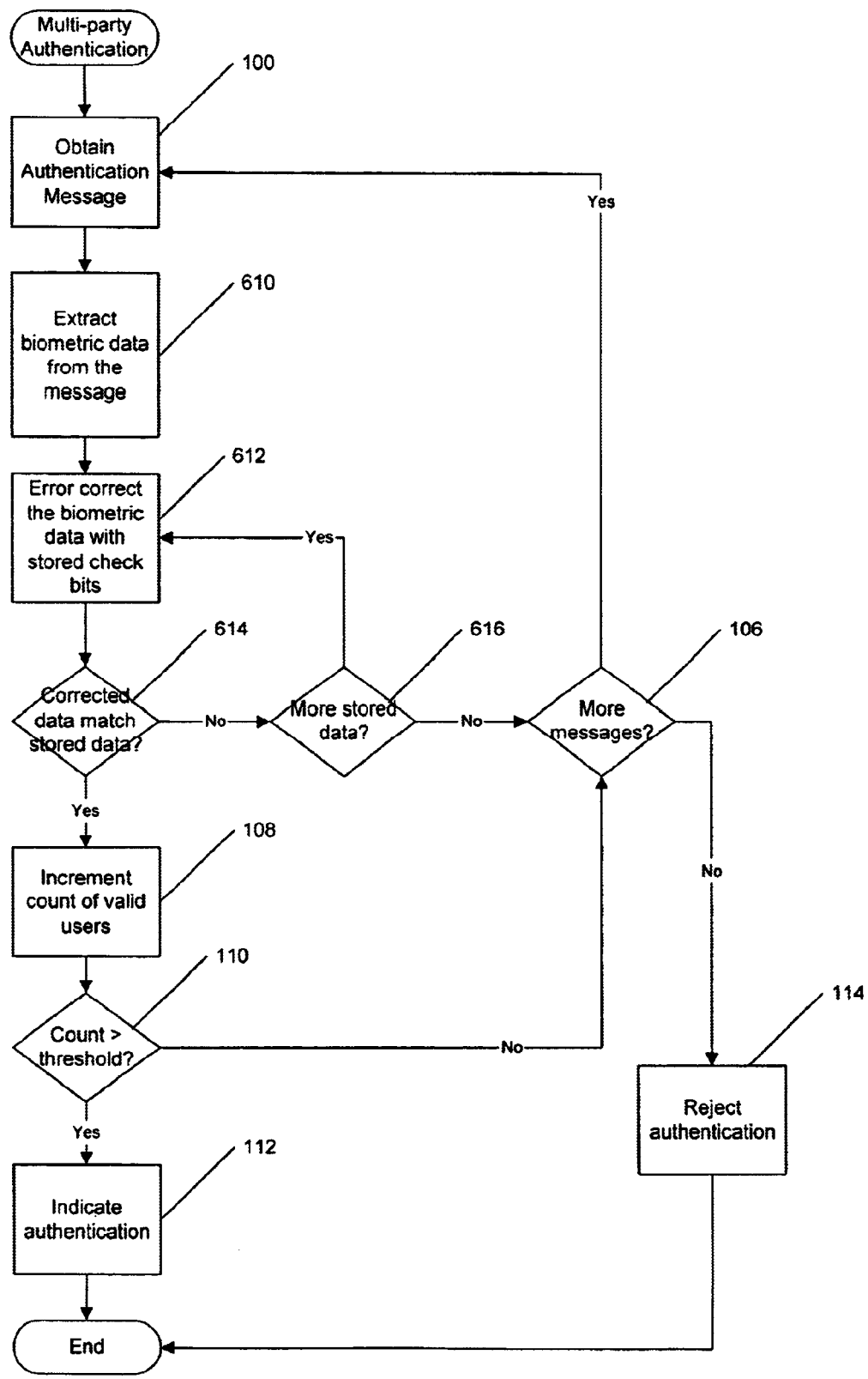
FIG. 12 is a flowchart illustrating operations according to one embodiment of the present invention utilizing error correction coding.

FIGS. 11 and 12 describe a further embodiment of the present invention where error correction is utilized in multi-party authentication/validation. The error correction embodiment of FIGS. 11 and 12 utilizes error correction codes described by Davida et al. identified above. The use of error correction codes may compensate for the fact that the biometrics acquired for an individual are not measured perfectly. Each such measurement can be represented as a binary vector of 0 and 1 bits, where any one measurement is at some Hamming distance from other measurements. For example, the codewords $c_1$=10110101 and $c_2$=10010111 are different in their $3^{rd}$ and $7^{th}$ bits, and so $c_1$ and $c_2$ have a hamming distance of 2. Empirical work in measuring biometrics, such as the iris, has shown that the expected hamming distance is about 10 percent. That is, in any two biometric samples, about 10 percent of the bits are different. Moreover, the errors in the measured biometric samples appear to be independent. Hence, error correction codes can be used advantageously to transform the "noisy" biometric samples into a constant or fixed value, which can be used as a biometric template.

As is seen in FIG. 11, an odd number (j) of biometric samples are obtained from each user (block 600) and the j biometric samples are majority decoded as described above (block 602) to provide a canonical biometric template T for each user. As described above, the generation of a canonical biometric template by majority decoding may be limited to only certain biometric types such as iris biometrics. However, if suitable substitutes for the canonical biometric template are available, then alternative biometrics may be utilized. Once the canonical biometric template T is obtained, error correction check digits, denoted by C, are computed on T (block 604). Davida, et al. describe a suitable algebraic decoding method, called an (N,M,D) code. With an (N,M,D) code, an information vector of M bits (in our case, a canonical biometric template T), can be encoded into a codeword or code vector $T^C$ consisting of the M-bit information vector concatenated with a (N-M) bit vector of error correction check digits (C). Once the check bits are determined, the check bits and the canonical template are stored for each user (block 606).

The verification process is illustrated in FIG. 12. During the verification process, j biometric measurements are independently generated on the user. These j biometric measurements, or vectors, are put through a majority decoder to obtain the user's M-bit biometric template T'. This biometric template T' is the provided as part of an authentication message (block 100) and the biometric template T' extracted from the message (block 610). Error correction is then performed on T' using the previously computed check digits, C, (block 612) to obtain the corrected biometric template T". The computed value of T" is then compared for equality against the canonical biometric template T (or reference value) (block 614). If T"=T, then the user is accepted and the valid count incremented (block 108) as described above. It is then determined if the count of valid users exceeds the threshold for allowing authentication (i.e. have k users provided valid biometric information) (block 110). If the threshold has been reached, then an indication of authenticity is provided (block 112).

As is seen in block 616, if T" and T do not match, then the procedure would be repeated using the $T^C$ values for additional users, until either a T"=T or until all $T^C$ values have been exhausted and no match is found, in which case the user is not identified and it is determined if more messages are to be processed (block 106). If more messages are available to process then the next message is obtained (block 100) and the validation process repeated. If however, no more messages are available to process, then there are insufficient users providing valid biometric information and the authentication of the users is rejected (block 114).

Figure 13:
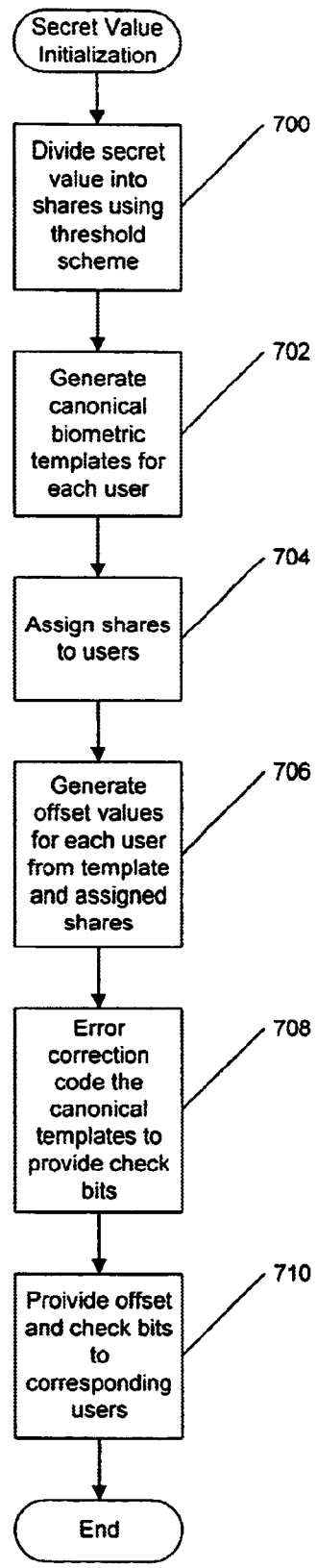
FIG. 13 is a flowchart illustrating operations for initialization of a system according to one embodiment of the present invention for recovering a secret value.
Figure 14:
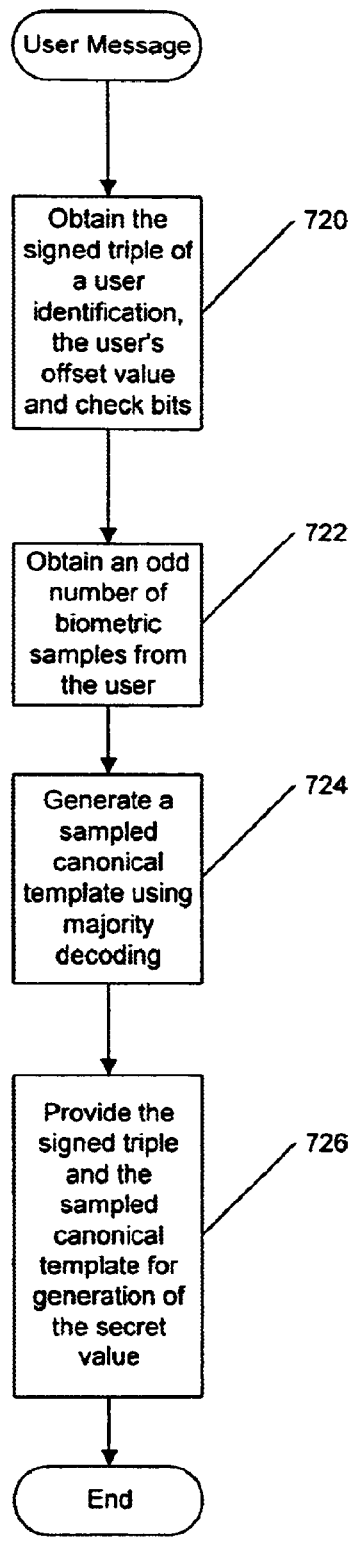
FIG. 14 is a flowchart illustrating operations carried out by a user according to one embodiment of the present invention for recovering a secret value.
Figure 15:
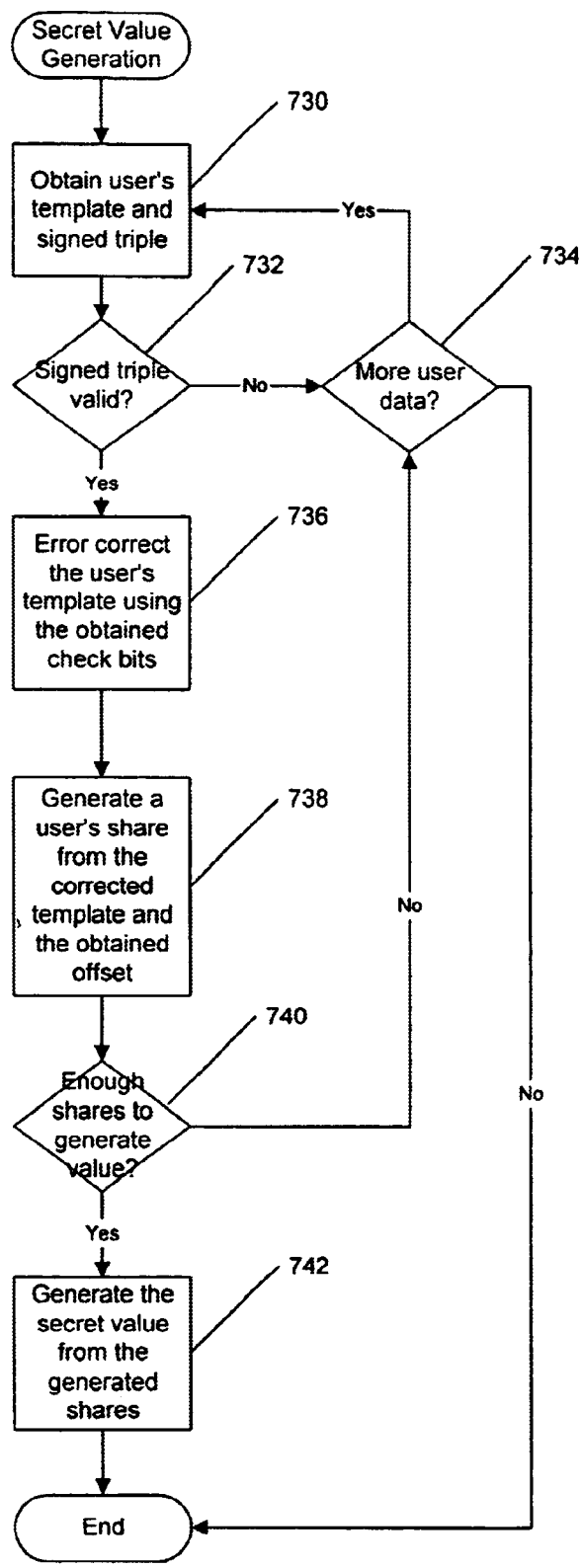
FIG. 15 is a flowchart illustrating operations according to one embodiment of the present invention for recovering a secret value.

In another embodiment of the present invention, a secret value, such as a secret key SK, may be determined from shares of the secret value distributed to multiple users. Such an embodiment of the present invention is illustrated in FIGS. 13, 14 and 15. The operations of FIGS. 13, 14 and 15 allow the secret key SK to be recovered from any k canonical biometric template values $T_1, T_2, \ldots, T_n$ and corresponding offset values $O_1, O_2, \ldots, O_n$. The canonical biometric template values $T_1, T_2, \ldots, T_n$ need not be stored within the system, but instead they may be recomputed (on-the-fly) using the error correction codes described above.

In the example utilized in describing the operations of FIGS. 13, 14 and 15, there are n users denoted $U_1, U_2, \ldots, U_n$. There also exists a system-defined public and private key pair, denoted PK and SK, used with a public key algorithm (e.g., the RSA cryptographic algorithm) for generating and verifying signatures. The private key, SK, is divided into n pieces or shares, denoted $S_1, S_2, \ldots, S_n$ (block 700). The precomputed shares $S_1, S_2, \ldots, S_n$ are used with an (n,k) threshold scheme, such that any k of the shares can be used to reconstruct the secret key SK. Pre-computed reference canonical biometric templates are determined for each user (block 702) and denoted by $T_1, T_2, \ldots, T_n$. The canonical biometric templates are computed from j (j is an odd number) biometric measurements generated for each user and put through a majority decoder as described above. The precomputed shares $S_1, S_2, \ldots, S_n$ are assigned to users (block 704) and the canonical biometric templates $T_1, T_2, \ldots, T_n$ are used to compute offset values, denoted by $O_1, O_2, \ldots, O_n$, where $O_i = S_i \oplus T_i$ for $i=1, 2, \ldots, n$ and "⊕" denotes the Exclusive-OR operation (block 706). An (N,M, D) code defined by the system is used to compute check digits, denoted $C_1, C_2, \ldots, C_n$, for each canonical biometric template (block 708).

Each user $U_i$ stores an offset value $O_i$ and check digits $C_i$ (block 710). In the preferred embodiment of the invention, the values $(U_i, O_i, C_i)$ are contained in a defined structure, such as a special biometric certificate, which is signed by a trusted authority and capable of being verified by the system using a trusted public key. For example, the system could make use of a public key infrastructure (PKI) in which biometric certificates are signed by a certification authority (CA). The biometric certificates are validated at the time the system needs to use the information contained within them to recompute the private signing key SK. Preferably, the users store the signed triple $(U_i, O_i, C_i)$ for use when generating the secret key.

In the event that the private signing key is to be recovered, k users are selected and notified. Each user $U_i$ then carries out the operations illustrated in FIG. 14. As seen in FIG. 14, each notified user obtains its previously stored signed triple $(U_i, O_i, C_i)$ (block 720). An odd number (j) of biometric measurements are independently generated on user $U_i$ (block 722) Preferably, the measurements are performed at system-controlled devices and the integrity of the measurements can be protected by the system. The j biometric measurements, or vectors, are put through a majority decoder to obtain the user $U_i$'s M-bit canonical biometric template $T_i'$ as described above (block 724). Preferably, the integrity of the biometric template $T_i'$ once computed is protected by the system for the duration of its use. The biometric template $T_i'$ and the signed triple $(U_i, O_i, C_i)$ are then sent to a central location under the control of the system where SK is to be recovered (block 726), e.g., a server controlled by the system.

The operations of FIG. 15 are performed at the central location when the users' data is received to recover SK at the central location. A user's template and signed triple are obtained (block 730) and the signed triple $(U_i, O_i, C_i)$ is validated using the public key of the trusted authority (e.g., a CA) (block 732). If the signed triple is not valid then it is determined if more user data is available (block 734). If more user data is available, then the next user data is obtained the process begins again. If no more user data is available, then k valid user data was not received and the secret value SK cannot be recovered so the operation ends.

If the signed triple is valid, then error correction is performed on $T_i'$ using check digits $C_i$ to obtain the corrected biometric template $T_i''$ (block 736). The values $T_i''$ and $O_i$ are then used to compute the candidate value $S_i''$ as follows: $S_i'' = O_i \oplus T_i''$ (block 738). If fewer than k shares have been recovered (block 740), then it is determined if more user data is available (block 734) and if so the process repeated. If not, then the process ends.

If k shares have been recovered, then each of the recovered candidate values of $S_i''$, for each of the k users, is used with the prescribed (n,k) threshold scheme to recover the signing key SK (block 742). Those skilled in the art will recognize that $S_i'' = S_i$ for each of the k users only if the users are valid, since only then are the users able to provide the correct j biometric measurements that will enable the recovery steps and the (n,k) threshold scheme itself to succeed.

The recovery system of FIGS. 13, 14 and 15, the pre-computed shares $S_1, S_2, \ldots, S_n$ are preferably kept secret. This implies that offset values $O_1, O_2, \ldots, O_n$ should also be kept secret, since the biometric data will (for practical purposes) be treated by the system as non-secret data. Therefore, it is preferred that each user protect the secrecy of their assigned offset value, and that the offset values are encrypted during periods in which they are transmitted to the central authority where they are used to recovery the key SK. Those skilled in the art will also recognize that there are many different protocols for establishing an encryption key between a user and a central authority (e.g., a server) and for accomplishing the required encryption operation. Accordingly, the present invention is not limited to any particular encryption methodology utilized between the user and the central authority.

As will be appreciated by those of skill in the art, the recovery system of FIGS. 13, 14 and 15 may also be utilized for multiparty authentication by testing the recovered secret value against a previously stored version of the secret value to determine if the two values correspond. If the recovered and stored secret values correspond, then the multiple parties are authenticated.

As each of the above described embodiments of the present invention allow for the use of multiple types of biometric information, it is preferred that the biometric information and types of biometric information associated with a user be maintained in a manner which allows for revising and/or changing the utilization of the biometric information for a given user. For example, the same exact biometric method may not withstand the test of time, due to different physical traits in individuals, due to injury relating to a body part associated with the particular biometric method, or due to any number of other factors, including social acceptance of certain techniques. Therefore, it is preferred that the embodiments of the present invention be capable of allowing different biometric validation techniques to be used concurrently or substituted over time.

To that end, it is preferred that a validation table which may be referred to as a "Biometric Substitution Table" be utilized in tracking biometric information associated with a user. This table is addressed with the user's user identification and contains the user identification (User ID), a primary biometric authentication value associated with the User ID, biometric templates associated with the User ID and, preferably, and identification of the type of biometric associated with each of the biometric template values. An example of such a table is illustrated in Table 1.

TABLE 1

Biometric Substitution Table

| User ID | Primary Biometric Authentication | Biometric Type | Biometric Template |
|---|---|---|---|
| User 1 | Voice | Right Thumb | 011001 . . . |
|  |  | Facial Scan | 101010 . . . |
|  |  | Voice | 110011 . . . |
|  |  | Left Iris | 111000 . . . |
|  |  | . . . | . . . |
| User 2 | Facial Scan | Right Thumb | 010111 . . . |
|  |  | Facial Scan | 100101 . . . |
|  |  | Voice | 001010 . . . |
|  |  | Left Iris | 110101 . . . |
| . |  |  |  |
| . |  |  |  |
| . |  |  |  |
| User n | Left Iris | Right Thumb | 101111 |
|  |  | Facial Scan | 111010 |
|  |  | Voice | 110111 |
|  |  | Left Iris | 000101 |
|  |  | . . . | . . . |

The above table may be utilized with the various embodiments of the present invention to store either encrypted or un-encrypted biometric templates, check bits or other biometric information associated with a user. Furthermore, while various embodiments of the present invention have been described as performing an exhaustive search to compare biometric information, as will be appreciated by those of skill in the art, if a user identification is provided by the users, then a comparison of only biometric information stored in the table associated with the user identification may be performed.

Figure 16:
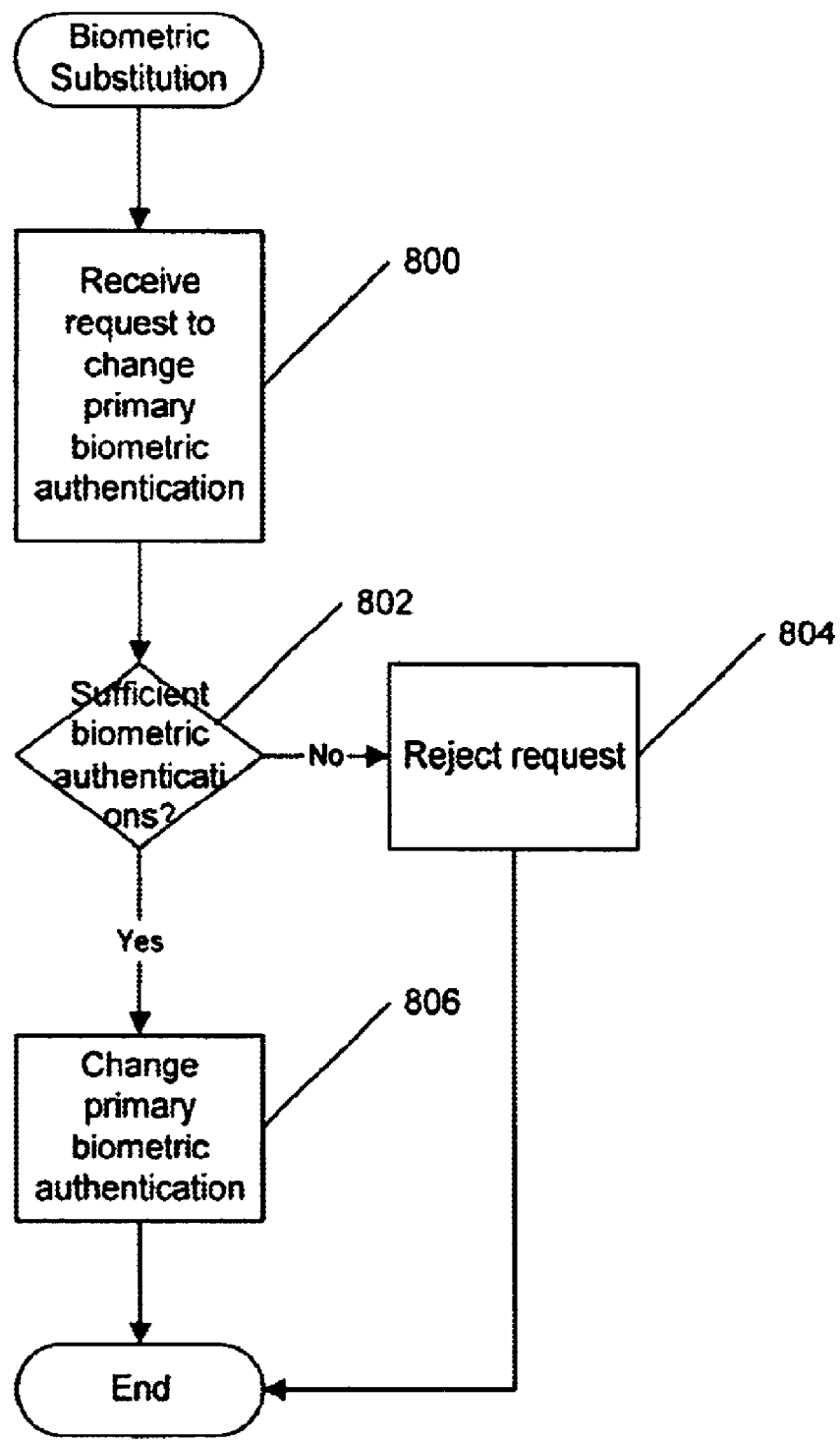
FIG. 16 is a flowchart illustrating operations according to an embodiment of the present invention for utilizing multiple biometric templates associated with a user.

The above table structure allows for adding new biometric information associated with a user as well as changing the biometric information utilized to match with user provided biometric information by changing the primary biometric authentication type for a user. A procedure for changing the primary biometric authentication type of a user is illustrated in FIG. 16.

Changing the primary biometric authentication type for a user requires x distinct biometric validations. The number x is defined by a security policy. The ability to change the primary validation mechanism allows new and improved biometric techniques to be integrated over time and allows flexibility in implementation.

As an example, suppose that User 1, whose primary biometric authentication type is voice, would like to change its primary biometric authentication type to facial scan. Suppose, also, that two distinct biometric validations are required in order for the change to be authorized (i.e., x=2 for User 1). In that case, biometric validations based on any two biometric types (right thumb, facial scan, voice or left iris) would permit User 1's primary biometric authentication type to be changed from voice to facial scan. Thus, as seen in FIG. 16, User 1 would request to change the primary biometric authentication type and provide at least two different types of biometric information with the message (block 800). It would then be determined if the biometric information provided is sufficient to allow the primary biometric authentication type to be changed (block 802). If two different types of valid biometric information are not provided, then the message is rejected (block 804). Otherwise, the primary biometric authentication type is changed to the requested type and the table is updated to reflect the change (block 806).

The present invention has been described with reference to "messages" and "authentication messages" however, as will be appreciated by those of skill in the art, the messages according to the present invention may be initiated by a user or user's processor or may be received in response to a request for authentication information from a central authority. Furthermore, the present invention should not be limited to any particular format for messages but the term message is used in a generic sense to describe the conveying of information to the object, process, program or processor which utilizes the information for authentication, validation or value generation.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of multi-party authentication wherein biometric templates (T) corresponding to encrypted biometric templates comprise f bits, wherein a publicly known prime number (p) is larger than $2^f$, and wherein a non-secret integer (g) is between 2 and p−2, the method comprising the steps of:

receiving a plurality of biometric authentication messages associated with a corresponding plurality of users wherein the biometric authentication messages include biometric data corresponding to the users that comprises an encrypted biometric sample;

determining if each of the plurality of received biometric authentication messages is a valid message based on the biometric data contained in the biometric authentication message so as to determine a quantity of valid biometric authentication messages;

providing an indication of authentication if the quantity of the valid messages of the received plurality of messages is at least an authentication threshold value of messages for different users of the plurality of users having different biometric data;

wherein a closeness between the received encrypted biometric sample and a candidate encrypted biometric template is determined based on a difference in value between the biometric sample and the biometric template, and wherein the step of determining comprises the steps of:

comparing the received encrypted biometric sample with encrypted biometric templates of valid users; and determining that the received biometric authentication message is a valid message if the comparison indicates that the received encrypted biometric sample corresponds to an encrypted biometric template of a valid user;

wherein the step of comparing comprises the steps of:

determining a closeness between the received encrypted biometric sample and a candidate encrypted biometric template; and determining that the encrypted biometric sample corresponds to the candidate encrypted biometric template if the closeness between the received encrypted biometric sample and a candidate encrypted biometric template is within a closeness threshold;

encrypting biometric templates (T) of valid users by determining $z=g^T \pmod p$ to provide the encrypted biometric templates (z) of valid users;

generating valid closeness indicator values (x) where $x=g_v \pmod p$ for v having integer values between 0 and a closeness threshold; and storing the valid closeness indicators.

2. A method according to claim 1, wherein the received biometric authentication messages comprise a user identification and user biometric data and wherein the step of determining comprises the steps of:

comparing the received user biometric data with previously stored biometric data corresponding to the user identification of the received biometric authentication message; and determining that the received biometric authentication message is a valid message if the comparison indicates that the received user biometric data corresponds to the stored biometric data.

3. A method according to claim 2, wherein the received user biometric data comprises a canonical biometric template generated from a plurality of biometric samples and wherein the previously stored biometric data comprises a canonical biometric template generated from a plurality of biometric samples.

4. A method according to claim 3, wherein the canonical biometric templates are generated by majority decoding the plurality of biometric samples.

5. A method according to claim 1, wherein the user biometric data and the stored biometric data comprise at least one of fingerprint, hand geometry, iris pattern, facial features, voice characteristics, handwriting dynamics, earlobe characteristics and keystroke dynamics.

6. A method according to claim 1, wherein the received biometric authentication message comprise a sample of biometric information from a user and a signed tuple comprising a user identification and a biometric template corresponding to the user, and wherein the step of determining comprises the steps of:

verifying the signature of the signed tuple;

comparing the received sample of user biometric data with the biometric template of the received tuple if the signature of the signed tuple is verified; and determining that the received biometric authentication message is a valid message if the comparison indicates that the received sample of user biometric data corresponds to the biometric template of the signed tuple.

7. A method according to claim 6, wherein the step of comparing comprises the steps of:

determining a closeness between the received sample of user biometric data and the biometric template of the signed tuple; and determining that the received sample of user biometric data corresponds to the biometric template of the signed tuple if the closeness between the received sample of user biometric data and the biometric template of the signed tuple is within a predefined closeness threshold.

8. A method according to claim 1 further comprising the steps of:

encrypting a biometric sample (B) by determining $y=g^B \pmod p$ so as to provide the encrypted biometric sample (y); and wherein the step of determining a closeness between the received encrypted biometric sample and a candidate encrypted biometric template and the step of determining that the encrypted biometric sample corresponds to the candidate encrypted biometric template if the closeness between the received encrypted biometric sample and a candidate encrypted biometric template is within a closeness threshold comprise the step of determining if at least one of $y/z \pmod p$ and $(y/z)^{-1} \pmod p$ is equal to one of the stored valid closeness indicator.

9. A method according to claim 1, wherein the biometric templates associated with a user comprises a plurality of biometric template having a plurality of closeness thresholds associated therewith, and wherein the step of generating valid closeness indicator values (x) where $x=g^v \pmod p$ for v having integer values between 0 and the closeness threshold comprises the step of generating valid closeness indicator values (x) where $x=g^v \pmod p$ for v having integer values between 0 and a highest value of the closeness thresholds associated with the plurality of biometric templates.

10. A method of multi-party authentication wherein a closeness between the received encrypted biometric sample and a candidate encrypted biometric template is determined based on a hamming distance between the biometric sample and the biometric template, wherein biometric templates (T) corresponding to the encrypted biometric templates comprise f bits, wherein a publicly known prime number (p) is larger than $2^f$, wherein a non-secret integer (g) is between 2 and p−2:

receiving a plurality of biometric authentication messages associated with a corresponding plurality of users wherein the biometric authentication messages include biometric data corresponding to the users that comprises an encrypted biometric sample;

determining if each of the plurality of received biometric authentication messages is a valid message based on the biometric data contained in the biometric authentication message so as to determine a quantity of valid biometric authentication messages;

providing an indication of authentication if the quantity of the valid messages of the received plurality of messages is at least an authentication threshold value of messages for different users of the plurality of users having different biometric data;

wherein the step of determining comprises the steps of:

comparing the received encrypted biometric sample with encrypted biometric templates of valid users; and determining that the received biometric authentication message is a valid message if the comparison indicates that the received encrypted biometric sample corresponds to an encrypted biometric template of a valid user;

wherein the step of comparing comprises the steps of:
determining a closeness between the received encrypted biometric sample and a candidate encrypted biometric template; and
determining that the encrypted biometric sample corresponds to the candidate encrypted biometric template if the closeness between the received encrypted biometric sample and a candidate encrypted biometric template is within a closeness threshold;

encrypting biometric templates (T) of valid users by determining $z=g^T \pmod{p}$ to provide the encrypted biometric templates (z) of valid users;

encrypting a biometric sample (B) by determining $y=g^B \pmod{p}$ so as to provide the encrypted biometric sample (y);

storing the set of values $2^{n^m}$ for each m and n where n is the set of integer values from 0 to 2 and m is the set of integer values from 0 to f−1 as a set of initial closeness indicators (c); and wherein the step of determining a closeness between the received encrypted biometric sample and a candidate encrypted biometric template and the step of determining that the encrypted biometric sample corresponds to the candidate encrypted biometric template if the closeness between the received encrypted biometric sample and a candidate encrypted biometric template is within a closeness threshold comprise the step of determining the closeness between the encrypted biometric sample (y) and the encrypted biometric template (z) utilizing the initial closeness indicators (c).

11. A method according to claim 10, wherein the step of determining the closeness between the encrypted biometric sample (y) and the encrypted biometric template (z) utilizing the initial closeness indicators (c) comprises the step of determining if at least one of $y/z \pmod p$ and $(y/z)^{-1} \pmod p$ is equal to one of the stored initial closeness indicators.

12. A method according to claim 10, wherein the step of determining the closeness between the encrypted biometric sample (y) and the encrypted biometric template (z) utilizing the initial closeness indicators (c) comprises the step of determining if at least one of $cy/z \pmod p$, $c(y/z)^{-1} \pmod p$, $c^{-1}(y/z) \pmod p$ and $c^{-1}(y/z)^{-1} \pmod p$ is equal to one of the stored initial closeness indicators.

13. A method of distributing a secret value across multiple users, the method comprising the steps of:
dividing the secret value into a plurality of shares;
determining a canonical biometric template for each of the multiple users;
encoding each of the canonical biometric templates to provide corresponding check digits; and
determining offsets for each of the multiple users wherein an offset associated with a user is determined based on the canonical biometric template of the user and a share of the secret value associated with the user.

14. A method according to claim 13, further comprising the step of providing the corresponding offset and check digits to corresponding ones of the multiple users.

15. A method according to claim 13, further comprising the steps of:
obtaining a sampled canonical biometric template from a plurality of the multiple users;
obtaining corresponding offset and check digits of the plurality of multiple users;
error correcting the sampled canonical biometric templates utilizing the corresponding check digits of the plurality of multiple users so as to provide corrected canonical biometric templates for the plurality of the multiple users;
determining shares of the secret value corresponding to the plurality of the multiple users from the corresponding offset and corrected canonical biometric templates of the plurality of the multiple users; and
recovering the secret value from the determined shares of the secret value.

16. A method according to claim 13, wherein the step of determining a canonical biometric template for each of the multiple users comprises the steps of:
obtaining a plurality of biometric samples for each of the multiple users; and
majority decoding the plurality of samples for corresponding ones of the multiple users so as to provide corresponding canonical biometric templates.

17. A method according to claim 13, where the step of encoding each of the canonical biometric templates to provide corresponding check digits, comprises the step of generating an (N,M,D) code having an M-bit information vector and N-M bits of error correction check digits where the canonical biometric templates comprise M bits.

18. A method according to claim 13, wherein the step of dividing the secret value into a plurality of shares comprises the step of dividing the secret value into a plurality of shares where the secret value can be reconstructed from fewer than all of the plurality of shares.

19. A method according to claim 13, wherein the secret value is a secret key utilized with a public key cryptographic algorithm.

20. A method according to claim 15, wherein the step of obtaining a sampled canonical biometric template from a plurality of the multiple users and the step of obtaining corresponding offset and check digits of the plurality of multiple users comprise the step of receiving from the plurality of multiple users a signed triple which comprises the offset, check digits and sampled canonical biometric templates corresponding to the user.

21. A method according to claim 20 further comprising the steps of:
verifying the authenticity of the signature of the signed triple; and
rejecting the signed triple if the verifying step fails to authenticate the signature of the signed triple.

22. A system for multi-party authentication, wherein biometric templates (T) corresponding to encrypted biometric templates comprise f bits, wherein a publicly known prime number (p) is larger than $2^f$, and wherein a non-secret integer (g) is between 2 and p−2, comprising:
means for receiving a plurality of biometric authentication messages from a corresponding plurality of users wherein the biometric authentication messages include biometric data corresponding to the user that comprises an encrypted biometric sample;
means for determining if each of the plurality of received biometric authentication messages is a valid message based on the biometric data contained in the biometric authentication messages so as to determine a quantity of valid biometric authentication messages; and
means for providing an indication of authentication if the quantity of the valid messages of the received plurality of messages is at least an authentication threshold value of messages for different users of the plurality of users having different biometric data;

wherein a closeness between the received encrypted biometric sample and a candidate encrypted biometric template is determined based on a difference in value between the biometric sample and the biometric template, and wherein the means for determining comprises:

means for comparing the received encrypted biometric sample with encrypted biometric templates of valid users; and means for determining that the received biometric authentication message is a valid message if the comparison indicates that the received encrypted biometric sample corresponds to an encrypted biometric template of a valid user;

wherein the means for comparing comprises:

means for determining a closeness between the received encrypted biometric sample and a candidate encrypted biometric template; and means for determining that the encrypted biometric sample corresponds to the candidate encrypted biometric template if the closeness between the received encrypted biometric sample and a candidate encrypted biometric template is within a closeness threshold;

means for encrypting biometric templates (T) of valid users by determining $z=g^T(\mod p)$ to provide the encrypted biometric templates (z) of valid users;

means for generating valid closeness indicator values (x) where $x=g^v$ (mod p) for v having integer values between 0 and a closeness threshold; and means for storing the valid closeness indicators.

23. A system for distributing a secret value across multiple users, comprising:

means for dividing the secret value into a plurality of shares;

means for determining a canonical biometric template for each of the multiple users;

means for encoding each of the canonical biometric templates to provide corresponding check digits;

means for determining offsets for each of the multiple users wherein an offset associated with a users is determined based on the canonical biometric template of the user and a share of the secret value associated with the user; and means for providing the corresponding offset and check digits to corresponding ones of the multiple users.

24. A computer program product for multi-party authentication wherein biometric templates (T) corresponding to encrypted biometric templates comprise f bits, wherein a publicly known prime number (p) is larger than $2^f$, and wherein a non-secret integer (g) is between 2 and p−2, comprising:

a computer-readable storage medium having computer-readable program code means embodied in said medium, said computer-readable program code means comprising:

computer-readable program code means for receiving a plurality of biometric authentication messages from a corresponding plurality of users wherein the biometric authentication messages include biometric data corresponding to the user that comprises an encrypted biometric sample;

computer-readable program code means for determining if each of the plurality of received biometric authentication messages is a valid message based on the biometric data contained in the biometric authentication messages so as to determine a quantity of valid biometric authentication messages; and computer-readable program code means for providing an indication of authentication if the quantity of the valid messages of the received plurality of messages is at least an authentication threshold value of messages for different users of the plurality of users having different biometric data;

wherein a closeness between the received encrypted biometric sample and a candidate encrypted biometric template is determined based on a difference in value between the biometric sample and the biometric template, and wherein the computer-readable program code means for determining comprises:

computer-readable program code means for comparing the received encrypted biometric sample with encrypted biometric templates of valid users; and computer-readable program code means for determining that the received biometric authentication message is a valid message if the comparison indicates that the received encrypted biometric sample corresponds to an encrypted biometric template of a valid user;

wherein the computer-readable program code means for comparing comprises:

computer-readable program code means for determining a closeness between the received encrypted biometric sample and a candidate encrypted biometric template; and computer-readable program code means for determining that the encrypted biometric sample corresponds to the candidate encrypted biometric template if the closeness between the received encrypted biometric sample and a candidate encrypted biometric template is within a closeness threshold;

computer-readable program code means for encrypting biometric templates (T) of valid users by determining $z=g^T(\mod p)$ to provide the encrypted biometric templates (z) of valid users;

computer-readable program code means for generating valid closeness indicator values (x) where $x=g^v$ (mod p) for v having integer values between 0 and a closeness threshold; and computer-readable program code means for storing the valid closeness indicators.

25. A computer program product for distributing a secret value across multiple users, comprising:

a computer-readable storage medium having computer-readable program code means embodied in said medium, said computer-readable program code means comprising:

computer-readable program code means for dividing the secret value into a plurality of shares;

computer-readable program code means for determining a canonical biometric template for each of the multiple users;

computer-readable program code means for encoding each of the canonical biometric templates to provide corresponding check digits;

computer-readable program code means for determining offsets for each of the multiple users wherein an offset associated with a users is determined based on the canonical biometric template of the user and a share of the secret value associated with the user; and computer-readable program code means for providing the corresponding offset and check digits to corresponding ones of the multiple users.

26. A system for multi-party authentication wherein a closeness between the received encrypted biometric sample and a candidate encrypted biometric template is determined based on a hamming distance between the biometric sample and the biometric template, wherein biometric templates (T) corresponding to the encrypted biometric templates comprise f bits, wherein a publicly known prime number (p) is larger than $2^f$, wherein a non-secret integer (g) is between 2 and p−2, comprising:

means for receiving a plurality of biometric authentication messages associated with a corresponding plurality of users wherein the biometric authentication messages include biometric data corresponding to the users that comprises an encrypted biometric sample;

means for determining if each of the plurality of received biometric authentication messages is a valid message based on the biometric data contained in the biometric authentication message so as to determine a quantity of valid biometric authentication messages;

means for providing an indication of authentication if the quantity of the valid messages of the received plurality of messages is at least an authentication threshold value of messages for different users of the plurality of users having different biometric data;

wherein the means for determining comprises:
means for comparing the received encrypted biometric sample with encrypted biometric templates of valid users; and means for determining that the received biometric authentication message is a valid message if the comparison indicates that the received encrypted biometric sample corresponds to an encrypted biometric template of a valid user;

wherein the means for comparing comprises:
means for determining a closeness between the received encrypted biometric sample and a candidate encrypted biometric template; and means for determining that the encrypted biometric sample corresponds to the candidate encrypted biometric template if the closeness between the received encrypted biometric sample and a candidate encrypted biometric template is within a closeness threshold;

means for encrypting biometric templates (T) of valid users by determining $z=g^T(\text{Mod } p)$ to provide the encrypted biometric templates (z) of valid users;

means for encrypting a biometric sample (B) by determining $y=g^B(\text{mod } p)$ so as to provide the encrypted biometric sample (y);

means for storing the set of values $2^{n^m}$ for each m and n where n is the set of integer values from 0 to 2 and m is the set of integer values from 0 to f−1 as a set of initial closeness indicators (c); and wherein the means for determining a closeness between the received encrypted biometric sample and a candidate encrypted biometric template and the means for determining that the encrypted biometric sample corresponds to the candidate encrypted biometric template if the closeness between the received encrypted bio-metric sample and a candidate encrypted biometric template is within a closeness threshold comprise means for determining the closeness between the encrypted biometric sample (y) and the encrypted biometric template (z) utilizing the initial closeness indicators (c).

27. A computer program product for multi-party authentication wherein a closeness between the received encrypted biometric sample and a candidate encrypted biometric template is determined based on a hamming distance between the biometric sample and the biometric template, wherein biometric templates (T) corresponding to the encrypted biometric templates comprise f bits, wherein a publicly known prime number (p) is larger than $2^f$, wherein a non-secret integer (g) is between 2 and p−2, comprising:

a computer-readable storage medium having computer-readable program code means embodied in said medium, said computer-readable program code means comprising:

computer-readable program code means for receiving a plurality of biometric authentication messages associated with a corresponding plurality of users wherein the biometric authentication messages include biometric data corresponding to the users that comprises an encrypted biometric sample;

computer-readable program code means for determining if each of the plurality of received biometric authentication messages is a valid message based on the biometric data contained in the biometric authentication message so as to determine a quantity of valid biometric authentication messages;

computer-readable program code means for providing an indication of authentication if the quantity of the valid messages of the received plurality of messages is at least an authentication threshold value of messages for different users of the plurality of users having different biometric data;

wherein the computer-readable program code means for determining comprises:
computer-readable program code means for comparing the received encrypted biometric sample with encrypted biometric templates of valid users; and computer-readable program code means for determining that the received biometric authentication message is a valid message if the comparison indicates that the received encrypted biometric sample corresponds to an encrypted biometric template of a valid user;

wherein the computer-readable program code means for comparing comprises:
computer-readable program code means for determining a closeness between the received encrypted biometric sample and a candidate encrypted biometric template; and computer-readable program code means for determining that the encrypted biometric sample corresponds to the candidate encrypted biometric template if the closeness between the received encrypted biometric sample and a candidate encrypted biometric template is within a closeness threshold;

computer-readable program code means for encrypting biometric templates (T) of valid users by determining $z=g^T(\text{mod } p)$ to provide the encrypted biometric templates (z) of valid users;

computer-readable program code means for encrypting a biometric sample (B) by determining $y=g^B \pmod{p}$ so as to provide the encrypted biometric sample (y);

computer-readable program code means for storing the set of values $2^{n^m}$ for each m and n where n is the set of integer values from 0 to 2 and m is the set of integer values from 0 to f–1 as a set of initial closeness indicators (c); and wherein the computer-readable program code means for determining a closeness between the received encrypted biometric sample and a candidate encrypted biometric template and the computer-readable program code means for determining that the encrypted biometric sample corresponds to the candidate encrypted biometric template if the closeness between the received encrypted biometric sample and a candidate encrypted biometric template is within a closeness threshold comprise computer-readable program code means for determining the closeness between the encrypted biometric sample (y) and the encrypted biometric template (z) utilizing the initial closeness indicators (c).

* * * * *